(12) United States Patent
Fujita et al.

(10) Patent No.: US 10,627,662 B2
(45) Date of Patent: Apr. 21, 2020

(54) PANEL MODULE AND DISPLAY DEVICE

(71) Applicant: Tianma Japan, Ltd., Kawasaki, Kanagawa (JP)

(72) Inventors: Akira Fujita, Kawasaki (JP); Akira Suzuki, Kawasaki (JP); Yoshiro Kitagawa, Kawasaki (JP)

(73) Assignee: TIANMA JAPAN, LTD., Kawasaki, Kanagawa (JP)

( * ) Notice: Subject to any disclaimer, the term of this patent is extended or adjusted under 35 U.S.C. 154(b) by 0 days.

(21) Appl. No.: 16/177,987

(22) Filed: Nov. 1, 2018

(65) Prior Publication Data

US 2019/0129219 A1    May 2, 2019

(30) Foreign Application Priority Data

Nov. 2, 2017    (JP) .................................. 2017-212563

(51) Int. Cl.
*G06F 1/16*        (2006.01)
*G02F 1/1333*      (2006.01)
*G02F 1/1335*      (2006.01)
*G06F 3/041*       (2006.01)
*G06F 3/044*       (2006.01)

(52) U.S. Cl.
CPC .... *G02F 1/13338* (2013.01); *G02F 1/133308* (2013.01); *G02F 1/133514* (2013.01); *G06F 1/1607* (2013.01); *G06F 3/041* (2013.01); *G06F 3/0412* (2013.01); *G02F 2001/133331* (2013.01); *G02F 2202/28* (2013.01); *G06F 3/044* (2013.01); *G06F 2203/04103* (2013.01)

(58) Field of Classification Search
CPC ........... G02F 1/13338; G02F 1/133308; G06F 1/1607
See application file for complete search history.

(56) References Cited

U.S. PATENT DOCUMENTS

| | | | | |
|---|---|---|---|---|
| 10,209,547 B2* | 2/2019 | Yoshida | ............ | G02F 1/133308 |
| 2007/0222912 A1* | 9/2007 | Sato | ................... | G02F 1/133528 349/58 |
| 2009/0103000 A1* | 4/2009 | Monden | ............ | G02F 1/133502 349/58 |
| 2009/0162645 A1* | 6/2009 | Matsuhira | ............. | G02F 1/1333 428/332 |
| 2010/0097552 A1* | 4/2010 | Shinya | ................... | C09J 109/00 349/122 |

(Continued)

FOREIGN PATENT DOCUMENTS

JP          2015-141374 A       8/2015

*Primary Examiner* — Hoa C Nguyen
*Assistant Examiner* — Keith DePew
(74) *Attorney, Agent, or Firm* — Sughrue Mion, PLLC

(57) ABSTRACT

A panel module includes a bonding resin layer between a first main face of a first substrate and a second main face of second substrate, and a bond made of cured adhesive. At least a part of an outer end face of the bonding resin layer is located inner than an outer end face of the first substrate and an outer end face of the second substrate. The bond has a stronger bonding force and a higher elasticity than the bonding resin layer. The bond is attached to a first region of the first main face and a second region of the second main face in an area outer than the bonding resin layer. The bond is attached to a third region of the outer end face of the second substrate and a fourth region of the first main face.

10 Claims, 22 Drawing Sheets

(56) References Cited

U.S. PATENT DOCUMENTS

| | | | |
|---|---|---|---|
| 2011/0205472 A1* | 8/2011 | Kobayashi | B32B 17/06 349/104 |
| 2011/0249212 A1* | 10/2011 | Monden | G09F 9/00 349/58 |
| 2013/0057485 A1* | 3/2013 | Lim | H04M 1/0266 345/173 |
| 2015/0212362 A1* | 7/2015 | Takaira | G02F 1/13338 349/12 |
| 2015/0355498 A1* | 12/2015 | Yoshida | G02F 1/133308 349/110 |
| 2019/0137810 A1* | 5/2019 | Yoshida | G02F 1/133308 |

* cited by examiner

SENSOR SUBSTRATE

FORMATION OF DAM/SPOT TEMPORARY CURING

| | COMPARATIVE EXAMPLE 1 | COMPARATIVE EXAMPLE 2 | EMBODIMENT |
|---|---|---|---|
| AVERAGE | 25.5 | 55.4 | 80.2 |
| σ | 0.73 | 10.0 | 10.2 |
| typ-3σ | 23.3 | 25.4 | 49.6 |
| COMPARISON | 1 | 1.09 | 2.13 |

PANEL MODULE AND DISPLAY DEVICE

CROSS-REFERENCE TO RELATED APPLICATIONS

This Non-provisional application claims priority under 35 U.S.C. § 119(a) on Patent Application No. 2017-212563 filed in Japan on Nov. 2, 2017, the entire content of which is hereby incorporated by reference.

BACKGROUND

This disclosure relates to a panel module and a display device.

In recent years, display devices with a transparent front panel on the front of the display module have been increasing; the transparent front panel can be an input interface component like a touch panel or a component for enhancing the appearance or protecting the surface of the display screen. One of the simple structures for such display devices is a structure (air-gap bonding structure) such that the display module and the front panel are bonded along the periphery with a double-sided tape (refer to JP 2015-141374 A, for example).

A touch panel module, which is an example of the front panel, generally has a structure such that a cover panel and a sensor glass are bonded together substantially over the entire face with a transparent optical elastic resin layer. The refractive index of the sensor glass is approximate to the refractive index of the optical elastic resin layer. This bonding technology using an optical elastic resin layer is called optical bonding (OB); it has not only the optical effects but also mechanical effects such as providing shatter protection in case of breakage of the front panel and increasing the impact resistance.

To form an optical elastic resin layer, optical clear resin (OCR) or optical clear adhesive (OCA) can be employed. The OCR is a liquid resin that cures with UV light or heat and the OCA is a sheet-type baseless adhesive tape.

JP 2015-141374 A discloses a reinforced structure of a display device including a touch panel. This display device includes a plurality of straight double-sided tapes (for example, polyolefin-based ones) that are bonded to a housing of a liquid crystal display (LCD) module along its rectangular opening with gaps therebetween and a plate-shaped member attached to cover the opening. The plate-shaped member includes a protection plate on the front and a touch panel bonded to the protection plate with an optical elastic resin layer.

The display device further includes a resin applied to the housing to fill the gaps between double-sided tapes and be in contact with the plate-shaped member. The touch panel is fixed to the housing along its periphery by the double-sided tapes and the resin. The resin in the gaps between double-sided tapes is in contact with the end faces of the touch panel and the protection plate. The resin shows reinforcement effects against the force to detach the optical elastic resin layer between the protection plate and the touch panel.

SUMMARY

An aspect of the present disclosure is a panel module including: a first substrate having a first main face; a second substrate laid over the first substrate, the second substrate having a second main face facing the first main face; a bonding resin layer provided between the first main face and the second main face and bonding the first main face and the second main face; and a bond made of cured adhesive. At least a part of an outer end face of the bonding resin layer is located inner than an outer end face of the first substrate and an outer end face of the second substrate. The bond has a stronger bonding force and a higher elasticity than the bonding resin layer. The bond is attached to a first region of the first main face and a second region of the second main face in an area outer than the bonding resin layer and between the first main face and the second main face. The bond is attached to a third region of the outer end face of the second substrate and a fourth region of the first main face. The third region is a region continued from the second region. The fourth region is a region continued from the first region in an area outer than the outer end face of the second substrate.

It is to be understood that both the foregoing general description and the following detailed description are exemplary and explanatory and are not restrictive of this disclosure.

EMBODIMENTS

Hereinafter, embodiments of this invention will be described with reference to the accompanying drawings. It should be noted that the embodiments are merely examples to implement this invention and are not to limit the technical scope of this invention. Elements common to the drawings are denoted by the same reference signs.

Configuration of Touch Panel Module

Figure 1A:
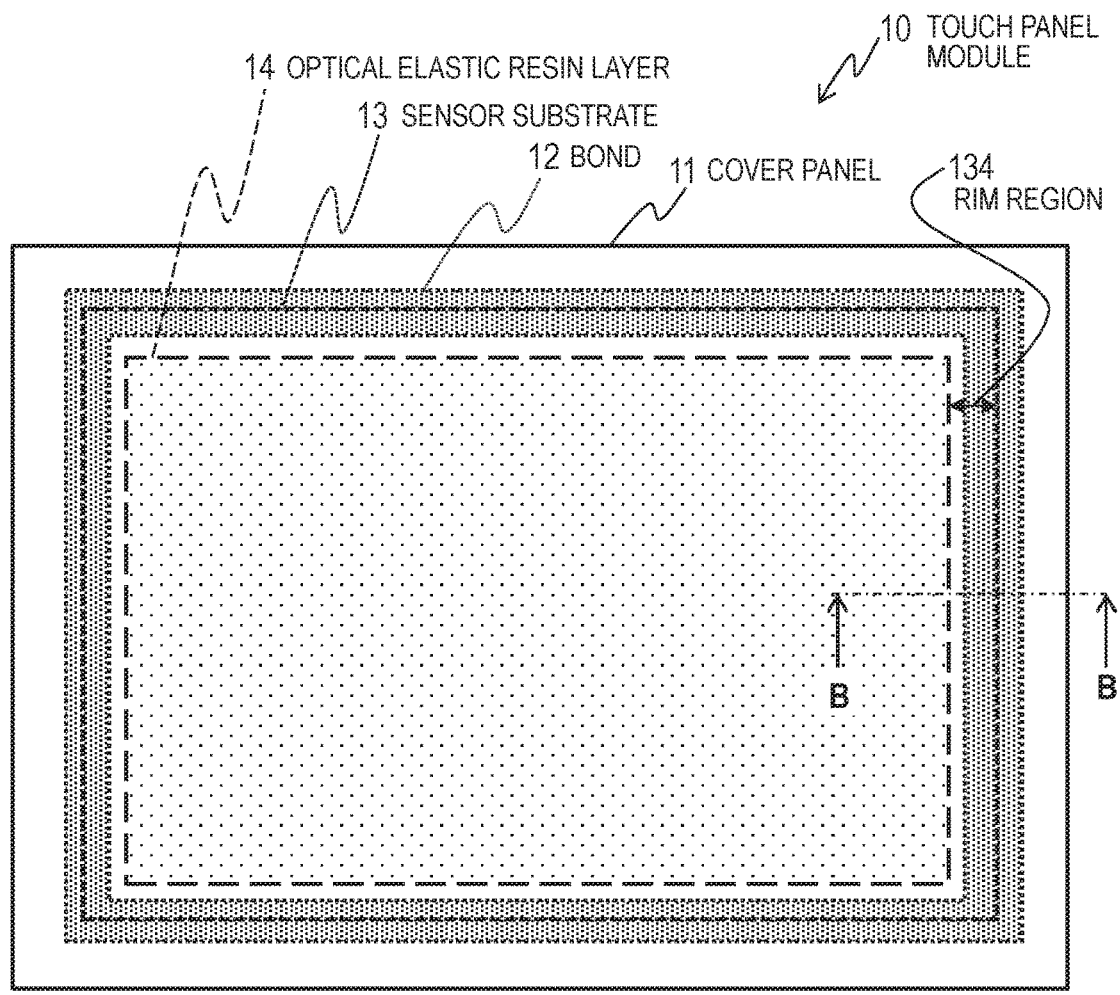
FIG. 1A is a plan diagram of a touch panel module.
Figure 1B:
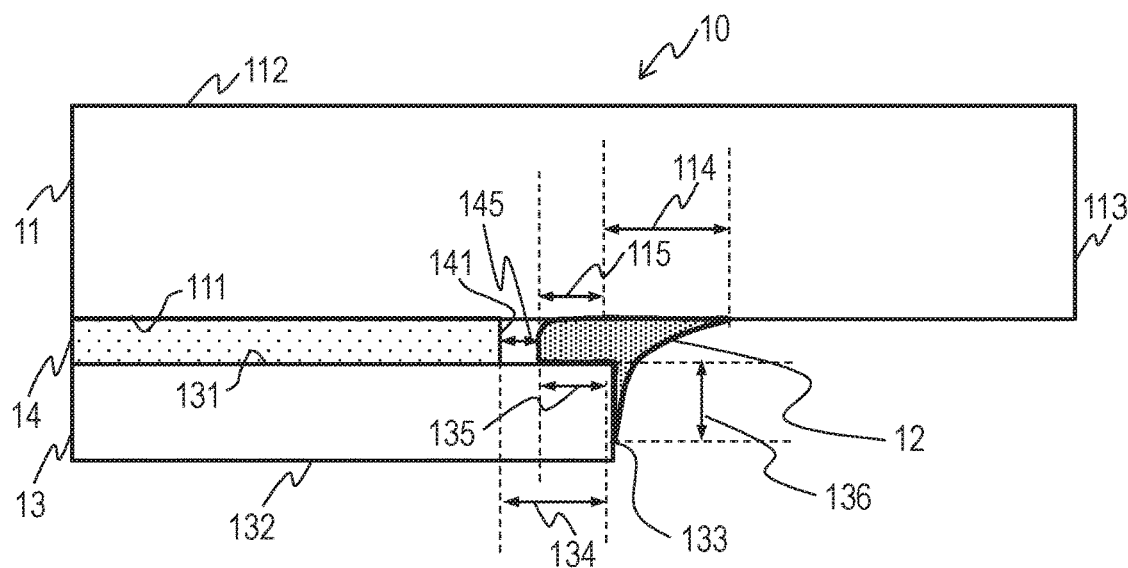
FIG. 1B is a cross-sectional diagram cut along the line B-B in FIG. 1A.

FIGS. 1A and 1B schematically illustrate a configuration example of a touch panel module 10. The touch panel module 10 is an example of a panel module. FIG. 1A is a plan diagram of the touch panel module 10; the components indicated by broken lines are disposed behind other components. FIG. 1B is a cross-sectional diagram cut along the line B-B in FIG. 1A.

As illustrated in FIG. 1B, the touch panel module 10 includes a cover panel 11 and a sensor substrate 13 laid thereunder. In the example of FIGS. 1A and 1B, the cover panel 11 and the sensor substrate 13 have rectangular shapes. These may have other shapes. An optical elastic resin layer 14 is provided between the cover panel 11 and the sensor substrate 13 to bond the cover panel 11 and the sensor substrate 13. The optical elastic resin layer 14 is an example of a bonding resin layer and the cover panel 11 and the sensor substrate 13 are bonded objects. The optical elastic resin layer is also referred to as optical clear resin or optical elastic adhesive.

The cover panel 11 is a transparent substrate, which is made of glass or resin, for example. The term "transparent" in this disclosure means a state in which the opposite side of the object can be seen and includes not only a colorless state with high transmittance for visible light but also a semi-transparent state with comparatively low transmittance and a colored transparent state. As illustrated in FIG. 1B, the cover panel 11 has a main face 111, another main face 112 on the opposite side, and four side end faces 113 surrounding the main faces 111 and 112. The sensor substrate 13 includes a transparent substrate made of glass or resin and has a main face 131, another main face 132 on the opposite side, and four side end faces 133 surrounding the main faces 131 and 132.

The main face 111 of the cover panel 11 faces the main face 131 of the sensor substrate 13. The optical elastic resin layer 14 is attached to the main faces 111 and 131 facing each other. The face 111 and its opposite face 112 of the cover panel 11 are the main faces of the cover panel 11. The face 131 and its opposite face 132 of the sensor substrate 13 are the main faces of the sensor substrate 13.

The sensor substrate 13 includes touch electrode patterns (not-shown) formed on the main face 131 of the transparent substrate. The touch electrode patterns are electrode patterns to detect a touch point of a pointer (for example, a finger). For example, the touch electrode patterns include a plurality of X electrodes and a plurality of Y electrodes that cross each other. The touch electrode patterns can be configured as desired.

The touch electrode patterns are driven by a not-shown controller to detect a touch point. The touch panel module 10 in this example employs projected capacitive sensing. The shapes and arrangement of the touch electrodes in the touch panel module 10 and the scheme of touch sensing can be selected as desired. For example, the touch electrodes may be provided on the face 111 of the cover panel 11.

The user touches the main face 112 of the cover panel 11 and the controller detects the touch point. In the following description, the side where the user touches is defined as front and the opposite side is defined as back or rear. For example, the cover panel 11 is disposed in front of the sensor substrate 13 and the optical elastic resin layer 14. The main faces 112 and 131 are the front faces of the cover panel 11 and the sensor substrate 13, respectively, and the main faces 111 and 132 are the back faces of the cover panel 11 and the sensor substrate 13, respectively. The direction along the main face of the cover panel 11 or the sensor substrate 13 is referred to as in-plane direction and the direction in which the cover panel 11 and the sensor substrate 13 are stacked is referred to as stacking direction.

The optical elastic resin layer 14 has substantially the same transparency as the cover panel 11 and has a refractive index approximate to those of the transparent cover panel 11 and the transparent substrate of the sensor substrate 13. The optical elastic resin layer 14 can be made of acrylic resin, urethane resin, or silicon resin. The optical elastic resin layer 14 can be made of optical clear resin (OCR), which is a liquid resin that cures with UV light, heat, or moisture. Alternatively, the optical elastic resin layer 14 can be made of optical clear adhesive (OCA).

The touch panel module 10 further includes a bond 12 for bonding the cover panel 11 and the sensor substrate 13. The bond 12 can be made of silicon resin, acrylic resin, or urethane resin that cures with UV light, heat, or moisture. The bonding force of the bond 12 is stronger than the bonding force of the optical elastic resin layer 14.

Furthermore, the elasticity of the bond 12 is higher than the elasticity of the optical elastic resin layer 14. The bond 12 reinforces the bonding of the cover panel 11 and the sensor substrate 13 to make the optical elastic resin layer 14 difficult to detach because of the force applied to the cover panel 11 and the sensor substrate 13. The optical elastic resin layer 14 has a bonding force of 0.1 to 1.5 Mpa and an elasticity of $1\times10^3$ to $1\times10^7$ Pa, for example. The bond 12 has a bonding force of 1.0 to 20 MPa and an elasticity of $1\times10^6$ to $1\times10^{10}$ Pa, for example. This elasticity is supposed to be represented by vertical tensile strength.

As illustrated in FIGS. 1A and 1B, the sensor substrate 13 is smaller in size than the cover panel 11, when seen in the stacking direction. The perimeter of the sensor substrate 13 is located inner than the perimeter of the cover panel 11. In other words, all side end faces 133 of the sensor substrate 13 are located inner than the side end faces 113 of the cover panel 11 when seen in the stacking direction. However, a part of the side end faces 133 of the sensor substrate 13 may be flush with the corresponding side end faces 113 of the cover panel 11.

As illustrated in FIGS. 1A and 1B, the optical elastic resin layer 14 is smaller in size than the sensor substrate 13. The perimeter of the optical elastic resin layer 14 is located inner than the perimeter of the sensor substrate 13. In other words, all side end faces 141 of the optical elastic resin layer 14 are located inner than the side end faces 133 of the sensor substrate 13 when seen in the stacking direction. However, a part of the side end faces 141 of the optical elastic resin layer 14 may be flash with the corresponding side end faces 133 of the sensor substrate 13.

In the example in FIGS. 1A and 1B, the optical elastic resin layer 14 is attached to the central region of the main face 131 of the sensor substrate 13 including the center of the main face 131 and does not cover the rim region 134 surrounding the central region. The rim region 134 faces the main face 111 of the cover panel 11 in the area outer than the optical elastic resin layer 14. The optical elastic resin layer 14 does not exist in the space between the rim region 134 and the cover panel 11.

In the example in FIGS. 1A and 1B, the bond 12 is bonding the sensor substrate 13 and the cover panel 11 in the periphery of the optical elastic resin layer 14. The bond 12 has a shape of a closed rectangular frame along the side end faces 133 of the sensor substrate 13. The bond 12 seals up the space between the sensor substrate 13 and the cover panel 11 that is containing the optical elastic resin layer 14.

The bond 12 is attached to each of the side end faces 133 of the sensor substrate 13 and is also attached to the main face 111 of the cover panel 11 in the region outer than the sensor substrate 13. Specifically, as illustrated in FIG. 1B, the bond 12 is attached to a part or all of the region 136 (the third region/the seventh region) of each side end face 133 of the sensor substrate 13 and is also attached to the region 114 (the fourth region/the eighth region) outer than the sensor substrate 13 of the main face 111 of the cover panel 11.

Furthermore, a part of the bond 12 is in the space between the sensor substrate 13 and the cover panel 11. The bond 12 is attached to the main face 131 of the sensor substrate 13 and the main face 111 of the cover panel 11 opposed to each other in the area outer than the optical elastic resin layer 14. Specifically, the bond 12 is attached to the outer region 135 (the second region/the sixth region) of the rim region 134 of the sensor substrate 13 and is also attached to the region 115 (the first region/the fifth region) of the main face 111 of the cover panel 11 opposed to the outer region 135 of the rim region 134.

The region 135 of the sensor substrate 13 inner than a side end face 133 is continuous to the region 136 of the side end face 133. The region 115 of the cover panel main face 111 inner than a side end face 133 of the sensor substrate 13 is continuous to the region 114 outer than the region 115.

In this example, the bond 12 bonds the sensor substrate 13 and the cover panel 11 in the entire periphery as illustrated in FIG. 1B. That is to say, the bonding regions 135 and 136 of the bond 12 in the rim region 134 and on the side end faces 133 surround the entire periphery. Furthermore, the region where the bond 12 is attached to the main face 111 of the cover panel 11 ranges from an area inner than the side end faces 133 of the sensor substrate 13 to an area outer than the side end faces 133 in the entire periphery. As illustrated in FIG. 1A, the entire outer end of the sensor substrate 13 is included in the bonding region of the bond 12 when seen in the stacking direction.

As described above, the bond 12 bonds the side end faces 133 of the sensor substrate 13 with the main face 111 of the cover panel 11 and also bonds the main face 131 of the sensor substrate 13 with the main face 111 of the cover panel 11.

As a result, the bond 12 reinforces the bonding by the optical elastic resin layer 14 to effectively prevent detachment of the optical elastic resin layer 14. For example, in the case where the cover panel 11 and the sensor substrate 13 have a large difference in thermal expansivity, the optical elastic resin layer 14 may receive a force in the detaching direction generated by significant environmental change in ambient temperature. Even in such a situation, the cover panel 11 and the sensor substrate 13 are securely bonded by the bond 12 to show detachment prevention effect.

In this example, the bond 12 is provided distant from the optical elastic resin layer 14. That is to say, a gap 145 is present between all side end faces 141 of the optical elastic resin layer 14 and the bond 12. This configuration prevents adverse effects on curing or bonding of the bond 12 caused by eduction (bleeding out) of a minute amount of uncured component from the optical elastic resin layer 14.

Furthermore, in the case where thermal expansion of the optical elastic resin layer 14 is large, the optical elastic resin layer 14 may be restrained from deforming because of the contact (bonding) with the bond 12 to detach easily. The gap 145 prevents such detachment of the optical elastic resin layer 14. If the bond 12 is not affected or little affected in bonding property or curing property, the bond 12 may be in contact with the optical elastic resin layer 14.

Method of Manufacturing Touch Panel Module

An example of a method of manufacturing the touch panel module 10 is described with reference to FIGS. 2A to 2H. This manufacturing method example forms the optical elastic resin layer 14 using a UV-curing optical clear resin (OCR) and forms the bond 12 using a moisture-curing adhesive. FIGS. 2A to 2H illustrate steps of manufacturing a touch panel module 10.

Figure 2A:
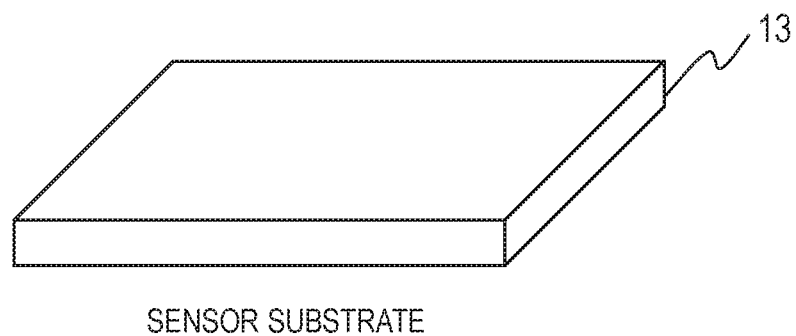
FIG. 2A illustrates a step of manufacturing a touch panel module.
Figure 2B:
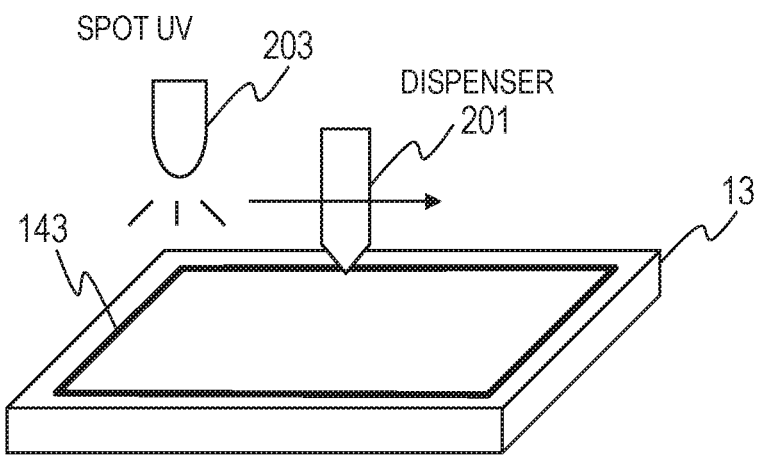
FIG. 2B illustrates a step of manufacturing a touch panel module.

First, the method prepares a sensor substrate 13, as illustrated in FIG. 2A. Next, the method forms a dam 143 on a main face of the sensor substrate 13 to outline an optical elastic resin layer 14, as illustrated in FIG. 2B. The formation of the dam 143 applies OCR with a dispenser 201 while irradiating the applied OCR with spot UV light from a spot-type UV light source 203 so that the OCR cures temporarily to keep the form.

Figure 2C:
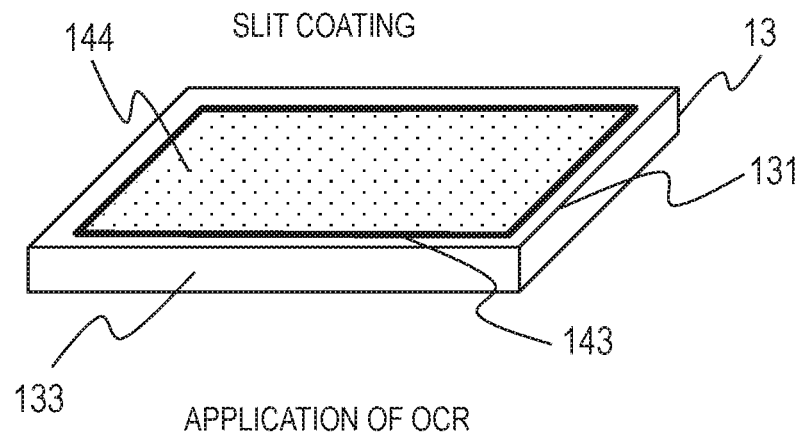
FIG. 2C illustrates a step of manufacturing a touch panel module.

Next, the method applies OCR 144 for bonding the entire face to the region defined by the dam 143 by slit coating, for example, as illustrated in FIG. 2C. The dam 143 is formed on the main face 131 of the sensor substrate 13 along the ends (the side end faces 133) of the main face 131 at a predetermined distance therefrom. Since the OCR is applied within the dam 143, a rim region 134 is formed where the OCR is not applied.

Figure 2D:
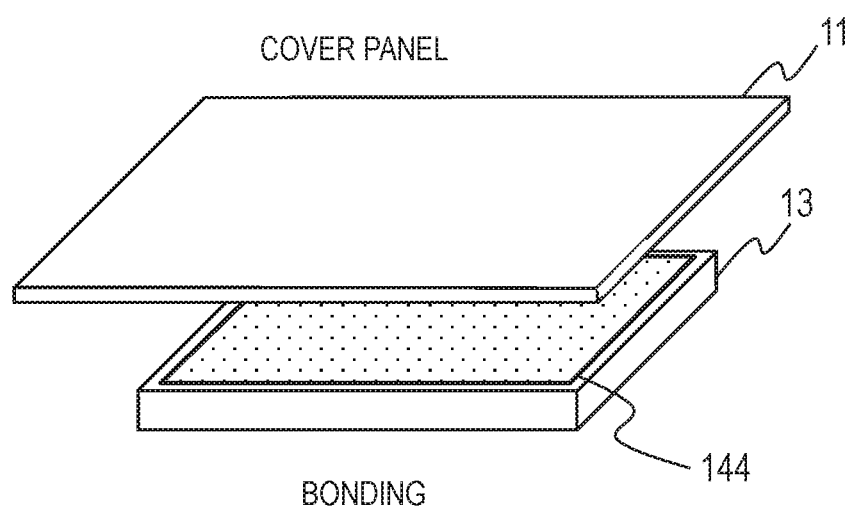
FIG. 2D illustrates a step of manufacturing a touch panel module.
Figure 2E:
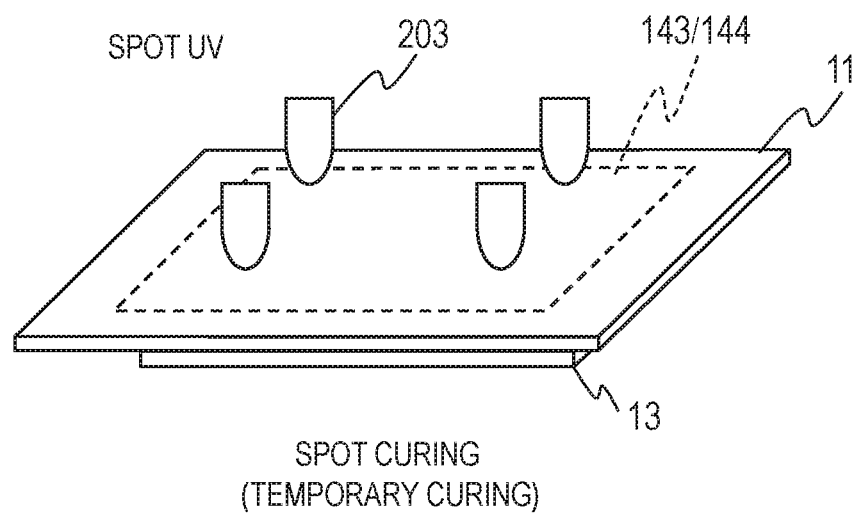
FIG. 2E illustrates a step of manufacturing a touch panel module.

Next, the method bonds the sensor substrate 13 and the cover panel together by sandwiching the OCR 144 therebetween under a reduced-pressure environment, for example, as illustrated in FIG. 2D. Further, the method applies spot UV light to some points of the OCR 144 with a spot UV light source 203 to temporarily cure the OCR 144, as illustrated in FIG. 2E.

Figure 2F:
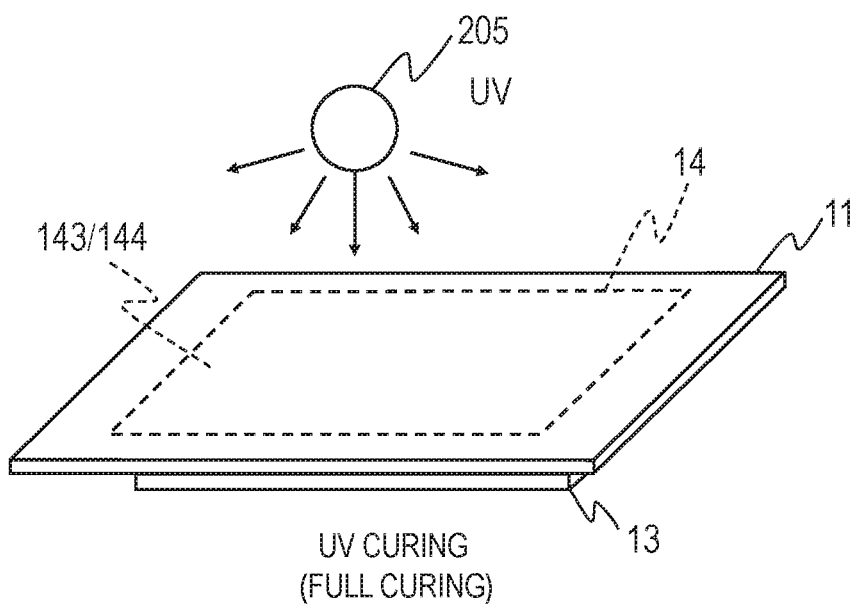
FIG. 2F illustrates a step of manufacturing a touch panel module.

Thereafter, the method applies a predetermined amount of UV light to the entire area of the OCR 144 with a UV light source 205 to cure the dam 143 and the OCR 144 to form the optical elastic resin layer 14, as illustrated in FIG. 2F. The optical elastic resin layer 14 bonds the cover panel 11 and the sensor substrate 13. The space (rim space) between the cover panel 11 and the sensor substrate 13 outer than the optical elastic resin layer 14 are vacant space. The vacant space is a space between the rim region 134 and the cover panel 11.

Figure 2G:
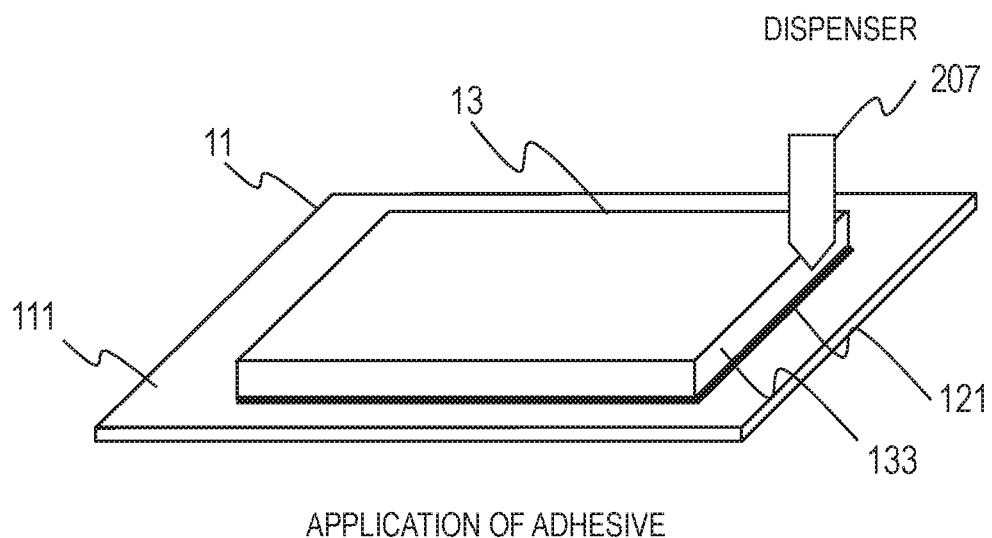
FIG. 2G illustrates a step of manufacturing a touch panel module.
Figure 2H:
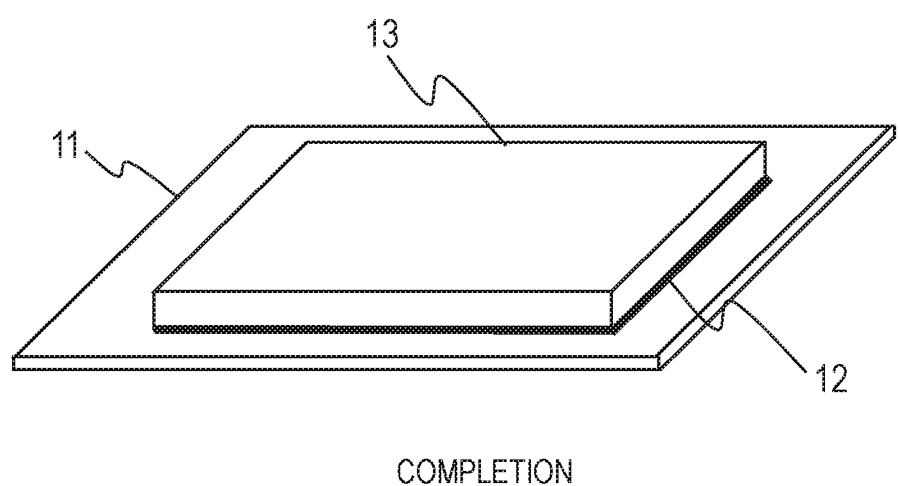
FIG. 2H illustrates a step of manufacturing a touch panel module.

Next, the method applies adhesive 121 along the perimeter of the sensor substrate 13 with a dispenser 207, as illustrated in FIG. 2G. The adhesive 121 adheres to the side end faces 133 of the sensor substrate 13 and the main face 111 of the cover panel 11 in the area outer than the sensor substrate 13. The adhesive 121 further enters the rim space between the cover panel 11 and the sensor substrate 13.

For example, the adhesive 121 is applied not to contact the optical elastic resin layer 14 so that bled-out OCR will not inhibit the adhesive 121 from curing. The cover panel 11 and the sensor substrate 13 with the adhesive 121 are left for a predetermined time in a room environment at normal temperature, for example. The adhesive 121 cures with moisture to become a bond 12.

As described above, the adhesive 121 enters the rim space between the sensor substrate 13 and the cover panel 11 provided along the perimeter of the optical elastic resin layer 14 for bonding the sensor substrate 13 and the cover panel 11 to become the bond 12 for bonding the main face 131 of the sensor substrate 13 and the main face 111 of the cover panel 11 opposed thereto.

To allow the adhesive 121 to enter the rim space between the sensor substrate 13 and the cover panel 11, the viscosity of the adhesive 121 to be applied is selected as appropriate. For example, the viscosity of the adhesive 121 to be applied can be of a value selected from a range from 1 Pa to 700 Pa or a value selected from a range from 10 Pa to 500 Pa.

The foregoing manufacturing method example uses moisture-curing adhesive; however, the manufacturing method can employ a different type of adhesive, such as UV-curing, heat-curing, or complex-curing type of adhesive. The optical elastic resin layer 14 can be formed of OCA, instead of OCR. For example, the method pastes OCA in the predetermined regions of the main face 131 of the sensor substrate 13 and presses the cover panel 11 against the OCA to bond the sensor substrate 13 and the cover panel 11. The OCR can be moisture-curing type, heat-curing type, or complex-curing type of these.

Display Device

Figure 3A:
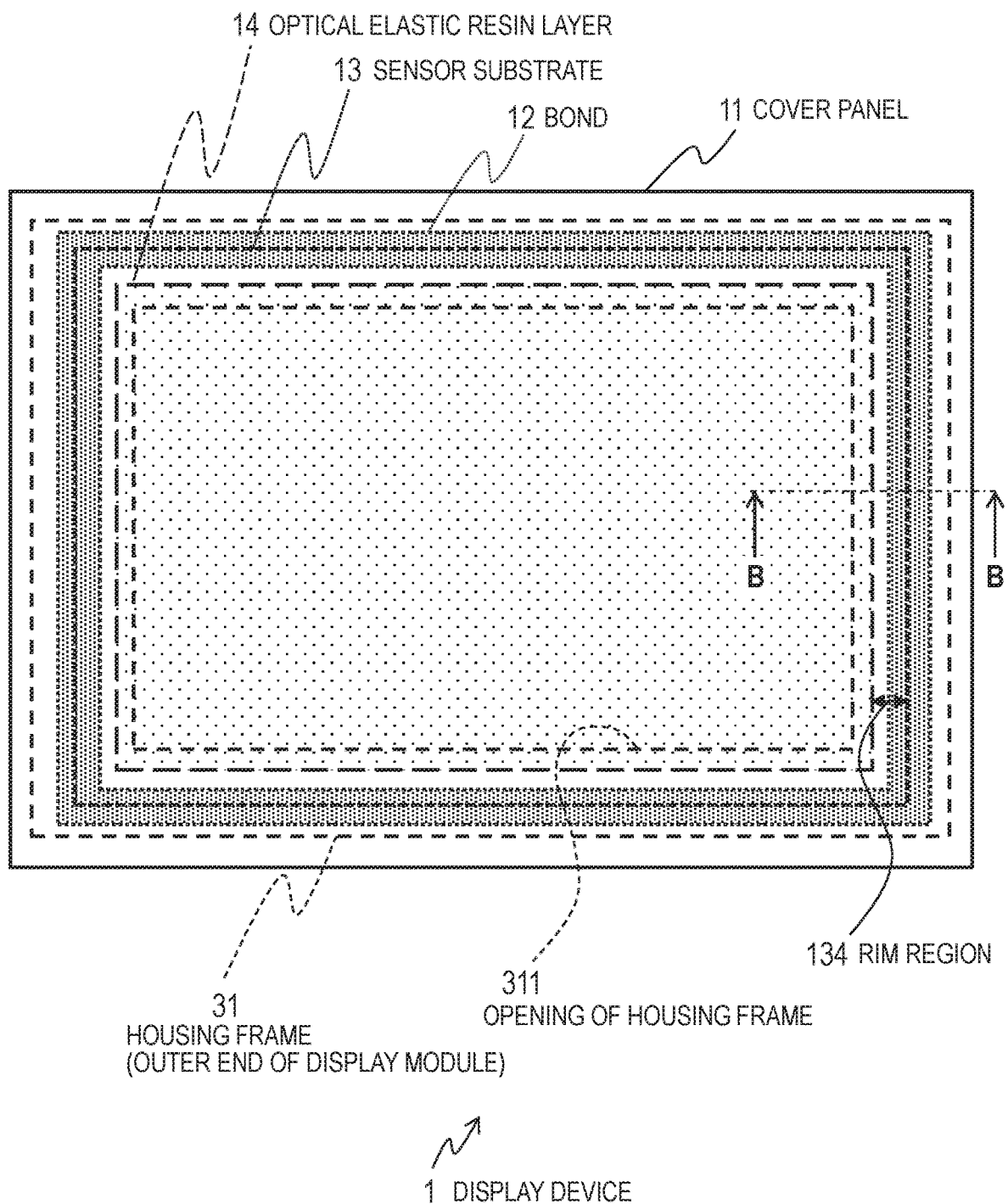
FIG. 3A is a plan diagram of a display device.
Figure 3B:
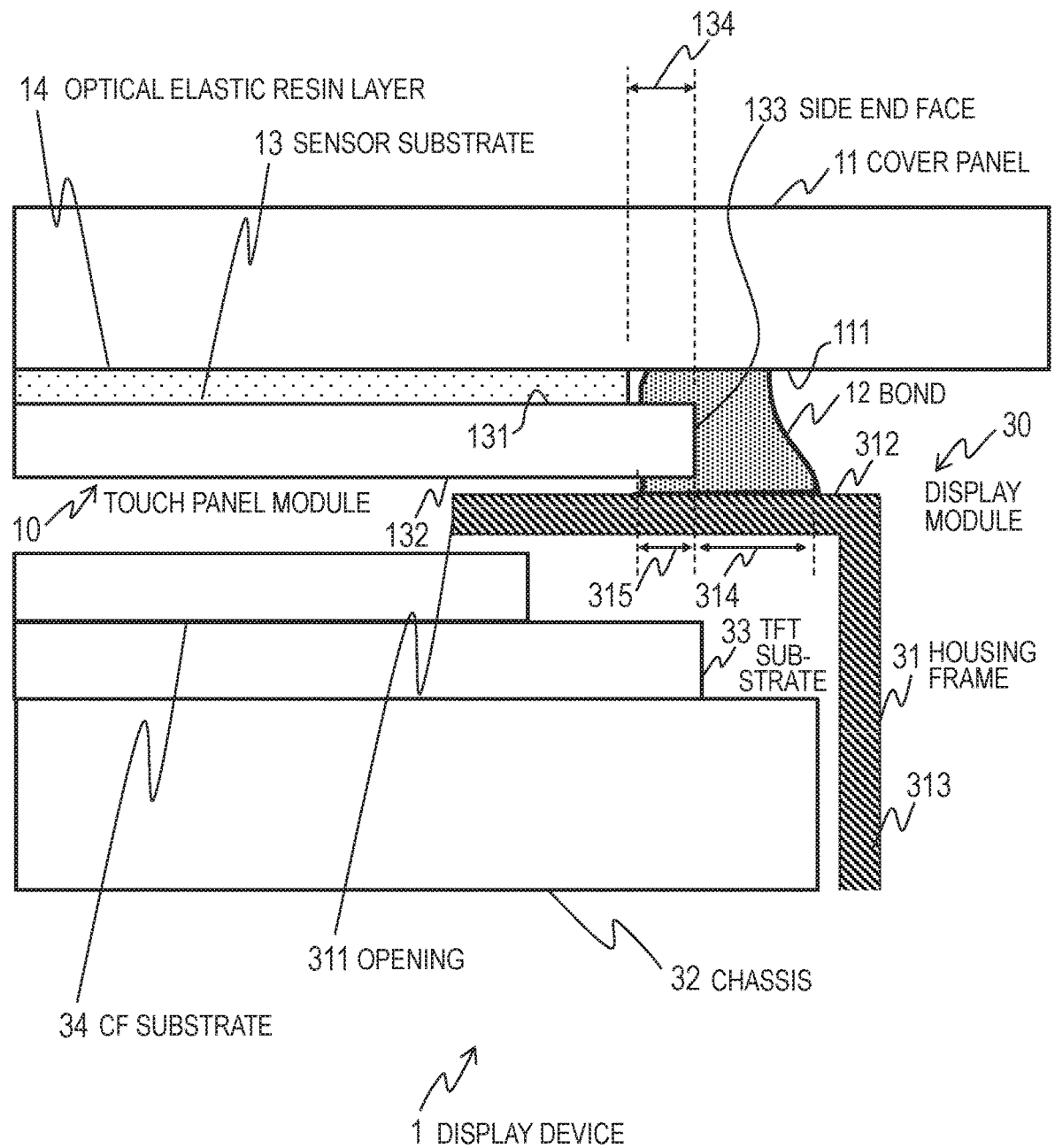
FIG. 3B is a cross-sectional diagram cut along the line B-B in FIG. 3A.

Hereinafter, a display device including a touch panel module 10 is described. FIGS. 3A and 3B schematically illustrate a configuration example of a display device 1. FIG. 3A is a plan diagram of the display device 1; the components indicated by broken lines are disposed behind other components. FIG. 3B is a cross-sectional diagram cut along the line B-B in FIG. 3A.

As illustrated in FIG. 3B, the display device 1 includes a touch panel module 10 and a display module 30. The touch panel module 10 is provided in front of the display module 30. The display module 30 in this example is a liquid crystal display module. The display module 30 can be a different type of display module such as an organic light-emitting diode (OLED) display module.

The display module 30 includes a housing frame 31, a chassis 32, a thin film transistor (TFT) substrate 33, and a color filter (CF) substrate 34. The housing frame 31, the CF substrate 34, the TFT substrate 33, and the chassis 32 are disposed in this order from the front.

The TFT substrate 33 and the CF substrate 34 constitute a liquid crystal display panel. The TFT substrate 33 and the CF substrate 34 are stacked and bonded by a not-shown sealant (adhesive). A liquid crystal material is encapsulated between the TFT substrate 33 and the CF substrate 34. The CF substrate 34 is provided in front of the TFT substrate 33.

The TFT substrate 33 can be disposed on the display screen side. In this example, the TFT substrate 33 and the CF substrate 34 have rectangular shapes. These may have different shapes. Each of the TFT substrate 33 and the CF substrate 34 has a front main face, a back main face, and four side end faces surrounding its main faces.

The TFT substrate 33 includes an insulating substrate, a TFT array circuit formed on the front main face of the insulating substrate and a polarizing plate secured to the back main face of the insulating substrate. The CF substrate 34 includes a multi-color filter layer provided on the back main face of an insulating substrate and a polarizing plate secured to the front main face of the insulating substrate. The color filter layer can be a mono-color filter layer (such as a black-and-white filter layer), instead of a multi-color filter layer.

The TFT substrate 33 and the CF substrate 34 are provided between the housing frame 31 on the front and the chassis 32 on the back. The housing frame 31 is secured to the chassis 32 and the TFT substrate 33 and the CF substrate 34 are accommodated in the internal space defined by the housing frame 31 and the chassis 32. The chassis 32 accommodates a not-shown backlight unit. The liquid crystal display panel is laid over the backlight unit and the chassis 32 supports the liquid crystal display panel from the back of the liquid crystal display panel.

The CF substrate 34 (display panel) is distant from the sensor substrate 13 (touch panel module 10); there is a space (air layer) between the front main face of the CF substrate 34 and the back main face of the sensor substrate 13.

As illustrated in FIG. 3A, the housing frame 31 has a rectangular opening 311 in the center thereof. The display region of the liquid crystal display panel is exposed in the opening 311 so that the user in front of the display device 1 can see the displayed image. The TFT substrate 33 controls the amount of light to be transmitted for each pixel in the display region under the control of a not-shown controller on the light from the backlight. The color filter layer of each pixel on the CF substrate 34 selects light of a specific color from the light from the TFT substrate 33 and transmits the selected light.

As illustrated in FIG. 3B, the housing frame 31 includes a rectangular front rim 312 defining the opening 311 and four side faces 313 continued from the front rim 312. The front rim 312 has a shape of a rectangular frame composed of four strip-like members when seen in the stacking direction. The side faces 313 extend backward from the outer ends of the four strip-like members.

The front rim 312 is disposed in front of the CF substrate 34 and covers the peripheral region surrounding the display region of the liquid crystal display panel. The four side faces 313 surround the side end faces of the TFT substrate 33, the CF substrate 34, and the chassis 32.

Figure 3C:
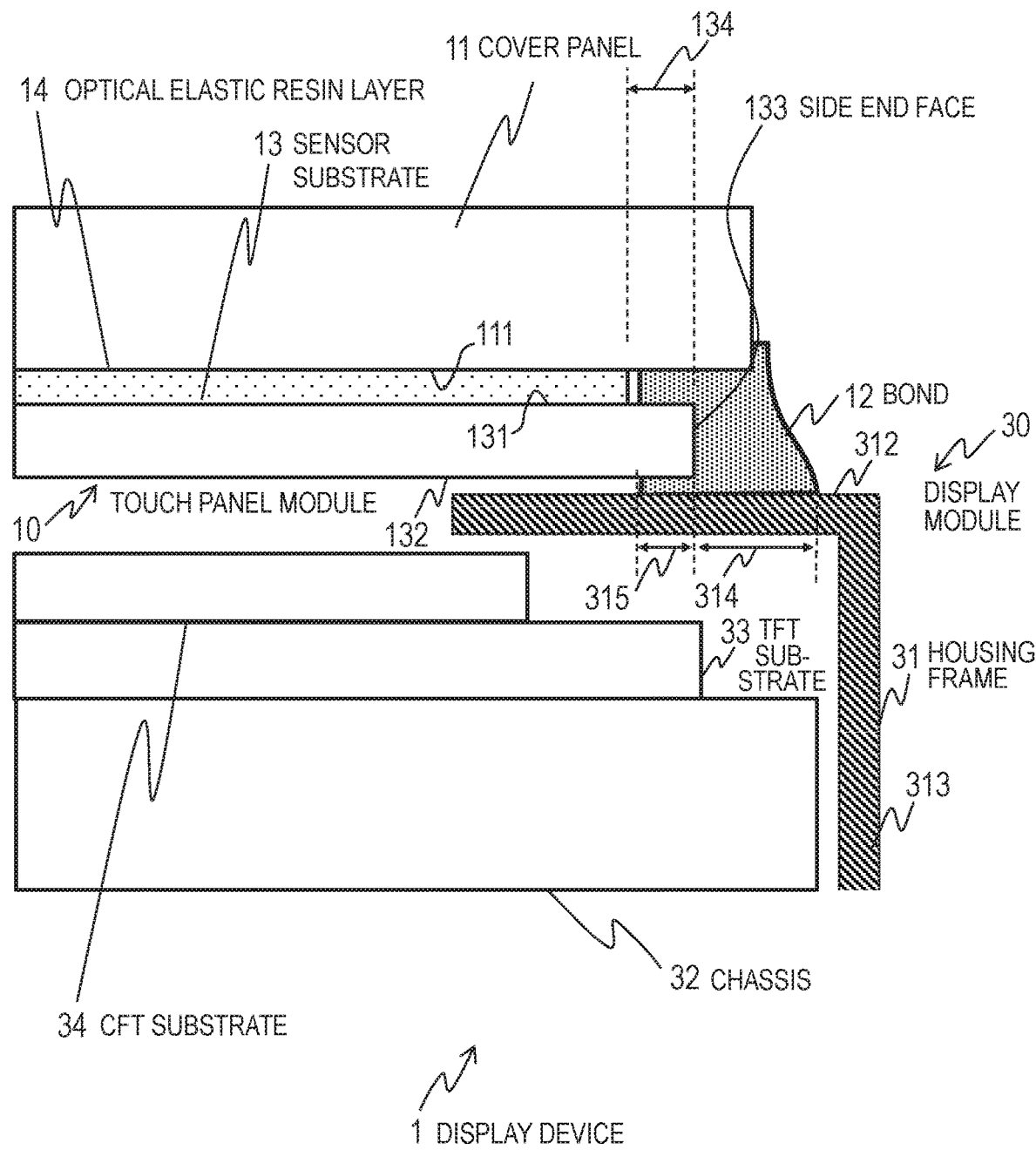
FIG. 3C is a cross sectional diagram of a display device in another configuration example.

As illustrated in FIGS. 3A and 3B, the outer end of the housing frame 31 is the outer end of the display module 30 when seen in the stacking direction. The housing frame 31 is smaller in size than the cover panel 11, when seen in the stacking direction. The perimeter of the housing frame 31 is located inner than the perimeter of the cover panel 11. That is to say, all side end faces (side faces 313) of the housing frame 31 are located inner than the side end faces 113 of the cover panel 11 when seen in the stacking direction. All side end faces (side faces 313) of the housing frame 31 may be located outer than the outer end of the cover panel 11, as illustrated in FIG. 3C.

The sensor substrate 13 is smaller in size than the housing frame 31, when seen in the stacking direction. The perimeter of the sensor substrate 13 is located inner than the perimeter of the housing frame 31. That is to say, all side end faces 133 of the sensor substrate 13 are located inner than the side end faces (side faces 313) of the housing frame 31 when seen in the stacking direction. The opening 311 of the housing frame 31 is smaller in size than the sensor substrate 13. The perimeter of the opening 311 is located inner than the perimeter of the sensor substrate 13. That is to say, all sides defining the opening 311 are located inner than the side end faces 133 of the sensor substrate 13 when seen in the stacking direction.

As illustrated in FIG. 3B, the bond 12 bonds the sensor substrate 13 and the cover panel 11 and further, bonds the touch panel module 10 and the housing frame 31. This configuration such that the bond 12 bonds the cover panel 11, the sensor substrate 13, and the housing frame 31 together prevents detachment of the optical elastic resin layer 14 effectively.

As described with reference to FIGS. 1A and 1B, the bond 12 bonds the back main face 111 of the cover panel 11, the side end faces 133 of the sensor substrate 13, and the front main face 131 of the sensor substrate 13. In the example of FIG. 3B, the bond 12 is further attached to the front face of the front rim 312 of the housing frame 31.

As illustrated in FIG. 3B, the front rim 312 of the housing frame 31 faces the back main face 111 of the cover panel 11 and the back main face 132 of the sensor substrate 13. The bond 12 is provided between the front face of the front rim 312 and the back main face 111 of the cover panel 11 to bond the front face of the front rim 312 and the back main face 111 of the cover panel 11. Specifically, the front rim 312 has a region 314 (the ninth region) facing the back main face 111 of the cover panel 11 in the area outer than the sensor substrate 13. The bond 12 is attached to the region 314 and the region of the back main face 111 of the cover panel 11 opposed to the region 314.

In this example, the bond 12 is provided between the front rim 312 and the back main face 132 of the sensor substrate 13 to further bond the front rim 312 and the back main face 132 of the sensor substrate 13. As a result, the touch panel module 10 is more securely bonded with the housing frame 31 to prevent detachment of the optical elastic resin layer 14 effectively.

Specifically, the front rim 312 has a region 315 facing the back main face 132 of the sensor substrate 13. The region 315 continues from the region 314. The region 315 is opposed to a region of the back main face 132 inner than its perimeter. The bond 12 is attached to the region 315 and the region of the back main face 132 of the sensor substrate 13 opposed to the region 315.

The above-described display module 30 includes a housing frame 31 disposed in front of the display panel and the bond 12 bonds the housing frame 31 and the touch panel module 10. Unlike this configuration, the display module 30 can omit the housing frame 31. For example, the bond 12 bonds the touch panel module 10, the front face of the display panel (the CF substrate 34 or the TFT substrate 33), and the back face of the touch panel module 10.

Method of Manufacturing Display Device

Figure 4A:
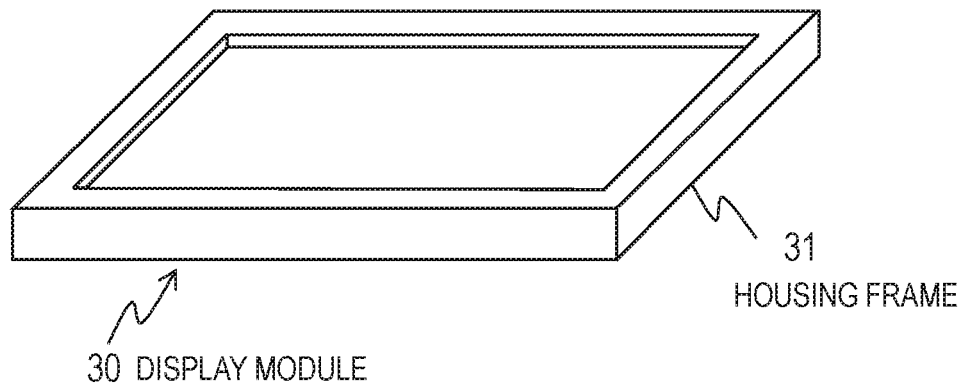
FIG. 4A illustrates a manufacturing step of a display device.
Figure 4B:
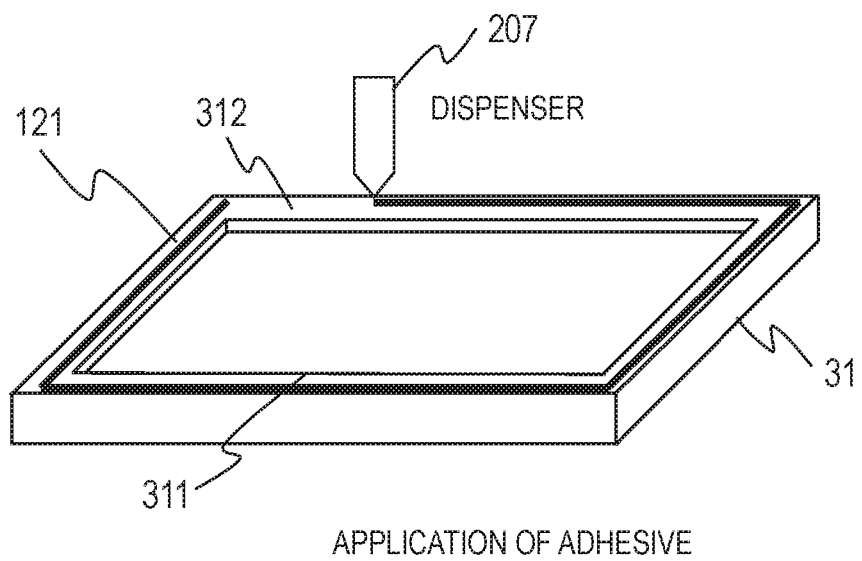
FIG. 4B illustrates a manufacturing step of a display device

An example of a method of manufacturing the display device 1 is described with reference to FIGS. 4A to 4E. First, the method prepares an assembled display module 30 including a housing frame 31, as illustrated in FIG. 4A. Manufacturing a display module is widely known; the details thereof are omitted herein. Next, the method applies adhesive 121 to the entire periphery of the front face of the front rim 312 of the housing frame 31 with a dispenser 207, as illustrated in FIG. 4B. The applied adhesive 121 is closed, surrounding the opening 311 of the housing frame 31.

Figure 4C:
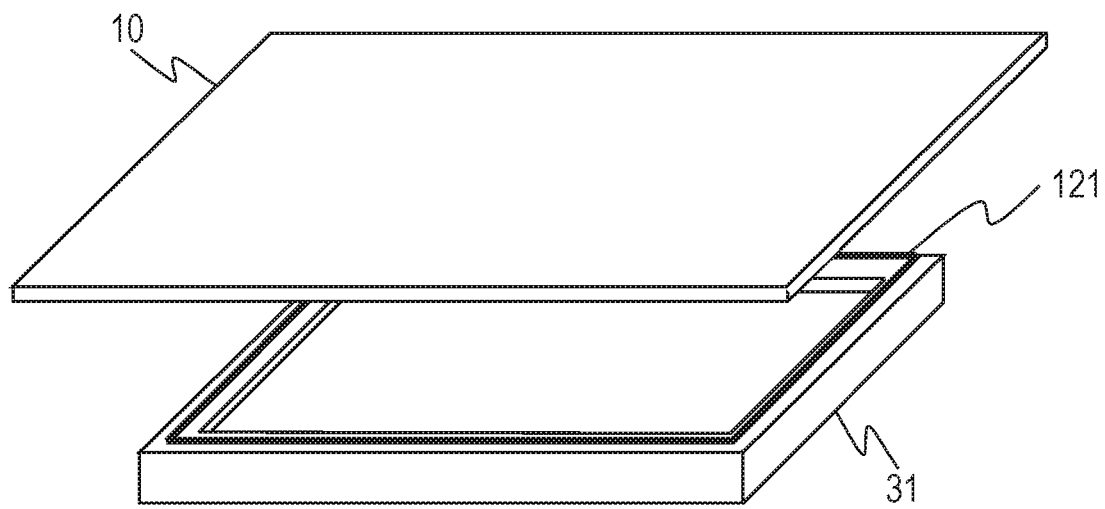
FIG. 4C illustrates a manufacturing step of a display device.

Next, the method bonds the touch panel module 10 and the display module 30 by sandwiching the applied adhesive 121 therebetween under the atmospheric pressure environment, as illustrated in FIG. 4C. Manufacturing the touch panel module 10 has been described with reference to FIGS. 2A to 2H.

Figure 4D:
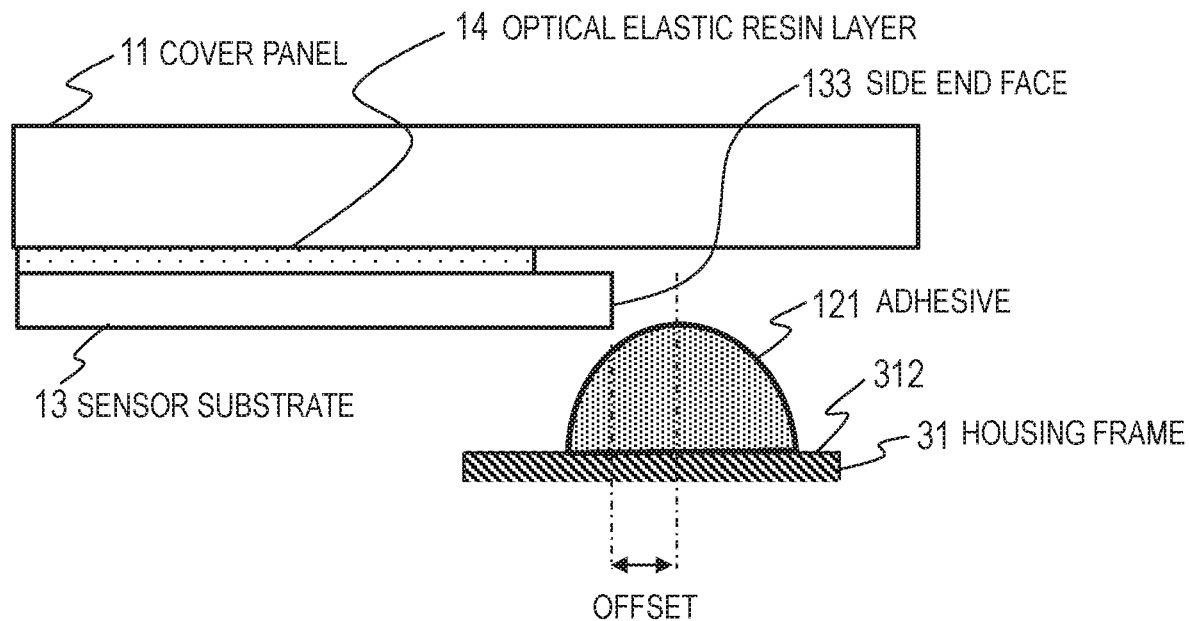
FIG. 4D illustrates a manufacturing step of a display device.
Figure 4E:
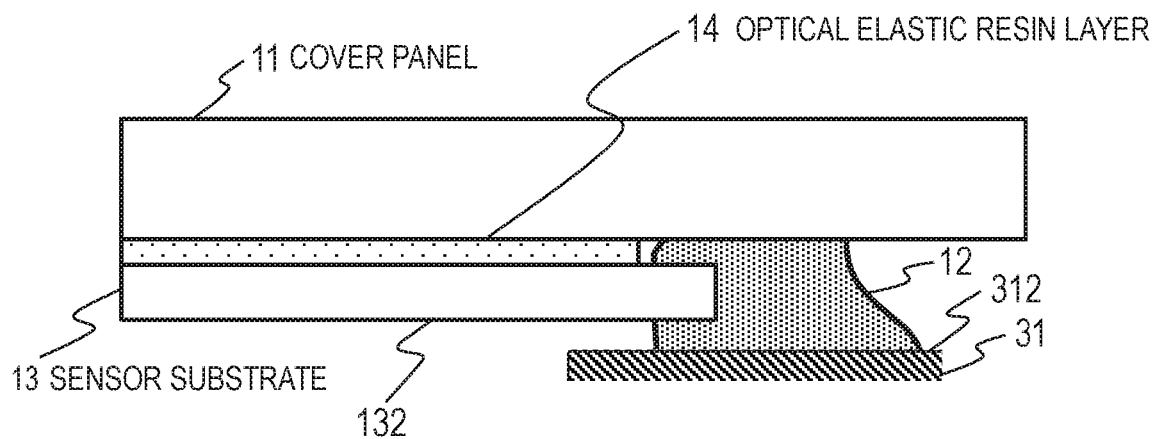
FIG. 4E illustrates a manufacturing step of a display device.

FIGS. 4D and 4E illustrate details of the bonding of the touch panel module 10 and the display module 30. The touch panel module 10 is positioned onto the display module 30 so that the adhesive 121 will enter the space between the cover panel 11 and the sensor substrate 13 and the space between the sensor substrate 13 and the housing frame 31 and is bonded with the display module 30.

Specifically, the touch panel module 10 is positioned onto the display module 30 (adhesive 121) so that the side end faces 133 of the sensor substrate 13 will be on the adhesive 121 when seen in the stacking direction. The adhesive 121 has been applied in a shape corresponding to the outer end (four side end faces 133) of the sensor substrate 13.

The method places the touch panel module 10 onto the housing frame 31 so that the side end faces 133 of the sensor substrate 13 will sink in the adhesive 121. The adhesive 121 is pressed and spread because of the weight of the touch panel module 10. The adhesive 121 enters the space between the sensor substrate 13 and the cover panel 11 and the space between the sensor substrate 13 and the housing frame 31.

As illustrated in FIG. 4D, an example of the bonding positions a side end face 133 of the sensor substrate 13 with an offset with respect to the top of the cross-section of the applied adhesive 121 so that the adhesive 121 can enter the space between the sensor substrate 13 and the cover panel 11 easily. This configuration prevents the adhesive 121 from unnecessarily spreading or becoming a defective bond 12.

If the viscosity of the adhesive is low, the adhesive 121 may be flattened to lose the gap between the housing frame 31 and the sensor substrate 13; as a result, the bonding force between the housing frame 31 and the touch panel module 10 might be lowered. In such a case, a predetermined gap is maintained between the housing frame 31 and the sensor substrate 13 with a bonding jig.

Performance Comparison

Figure 5:
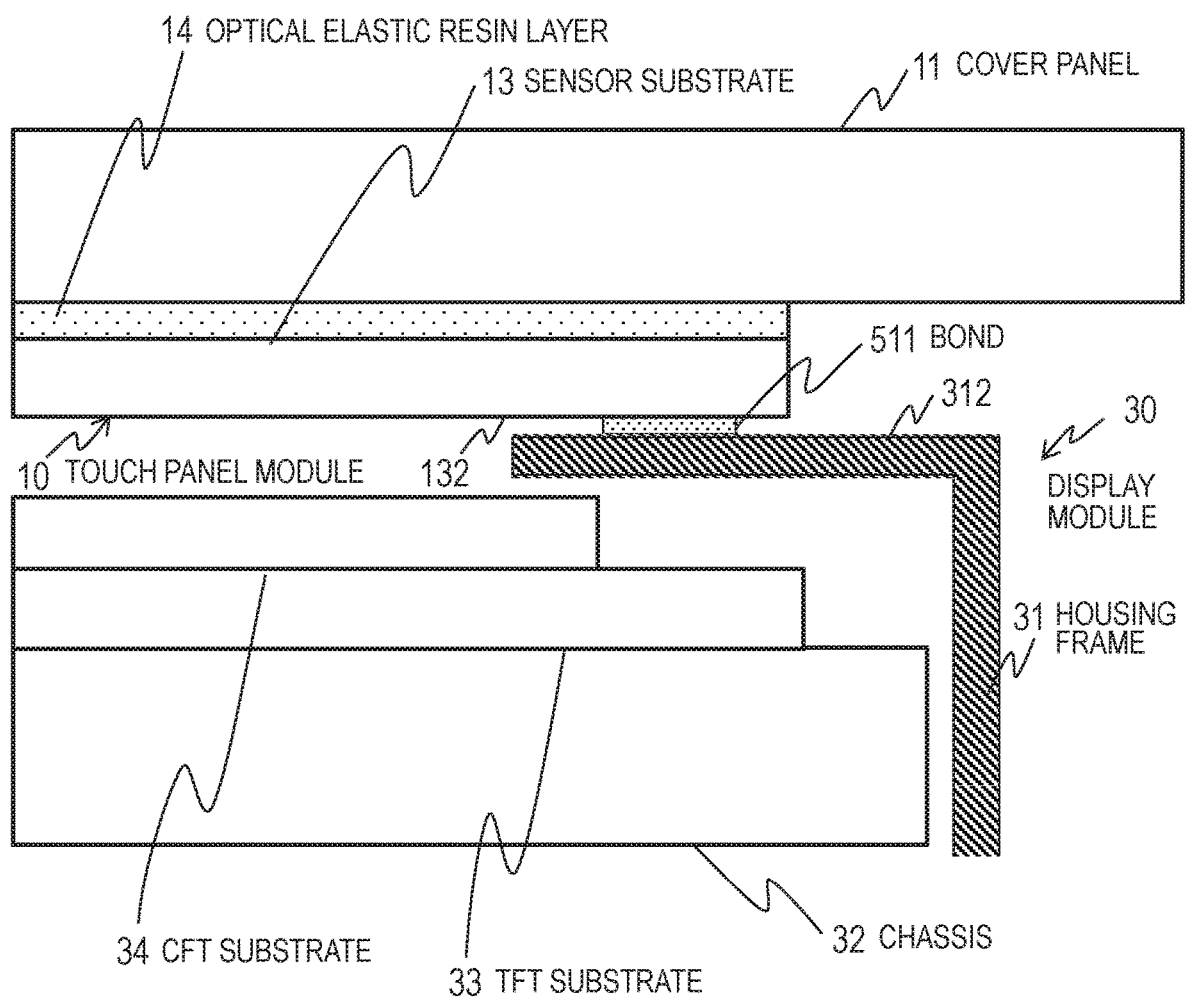
FIG. 5 illustrates a configuration of a display device of the first comparative example.

Hereinafter, results of comparison of the display device in this embodiment with a plurality of comparative examples are described. The configuration of the display device 1 in this embodiment has been described with reference to FIGS. 3A and 3B. FIG. 5 illustrates a configuration of a display device of the first comparative example (Comparative Example 1) and FIG. 6 illustrates a configuration of a display device of the second comparative example (Comparative Example 2).

The difference of the first comparative example in FIG. 5 from the configuration example of this embodiment in FIGS. 3A and 3B is in the structure of the bond. The bond 511 of the first comparative example is provided only between the sensor substrate 13 of the touch panel module 10 and the front rim 312 of the housing frame 31. The material of the bond 511 is the same as that of the bond 12 in the embodiment.

Figure 6:
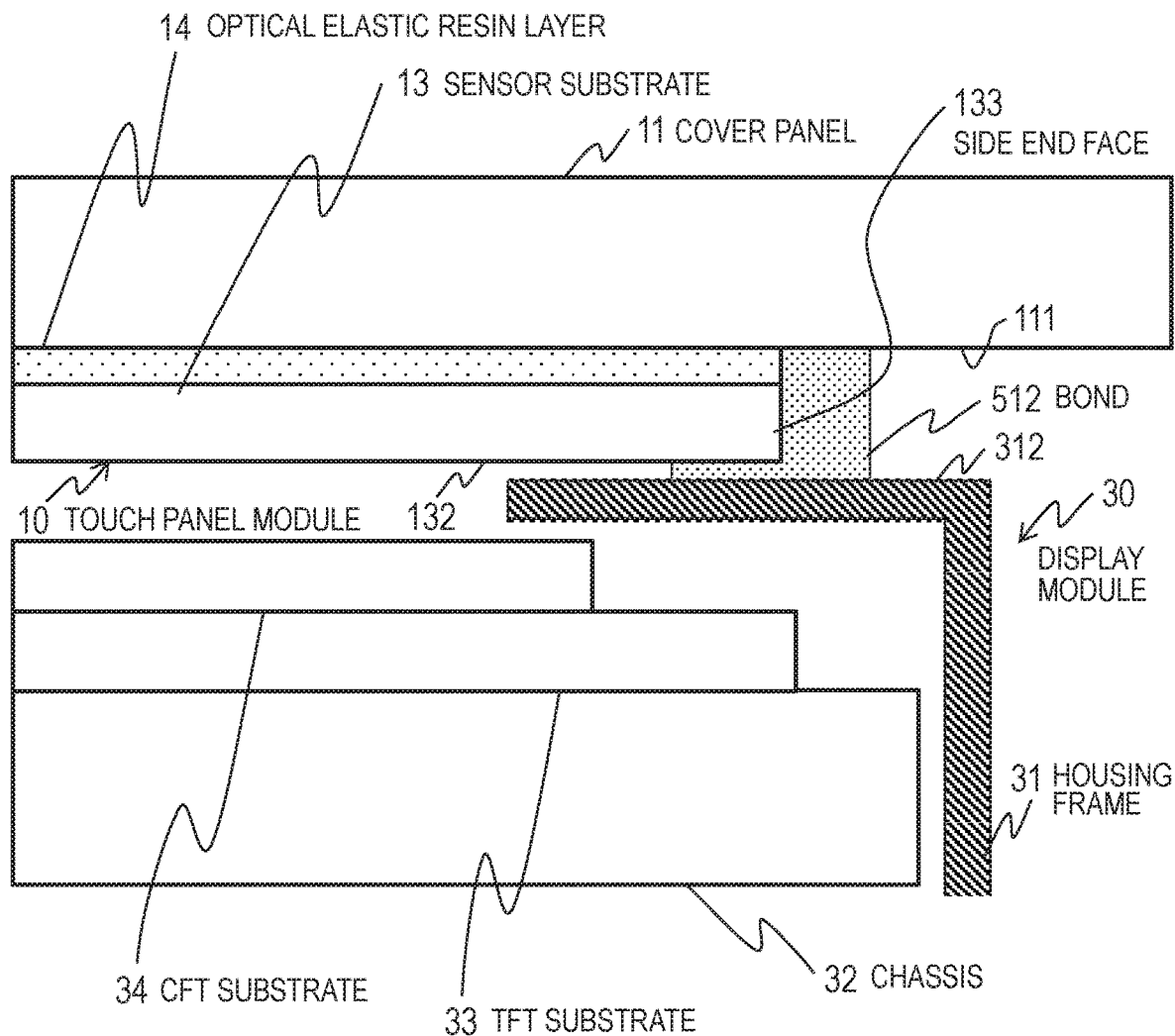
FIG. 6 illustrates a configuration of a display device of the second comparative example.

The difference of the second comparative example in FIG. 6 from the configuration example of this embodiment in FIGS. 3A and 3B is in the structure of the bond. The bond 512 of the second comparative example is provided only between the sensor substrate 13 of the touch panel module 10 and the front rim 312 of the housing frame 31 and between the cover panel 11 of the touch panel module 10 and the front rim 312 of the housing frame 31. The bond 512 does not exist between the sensor substrate 13 and the cover panel 11 of the touch panel module 10. The material of the bond 512 is the same as that of the bond 12 in the embodiment.

Figures 7, 8:
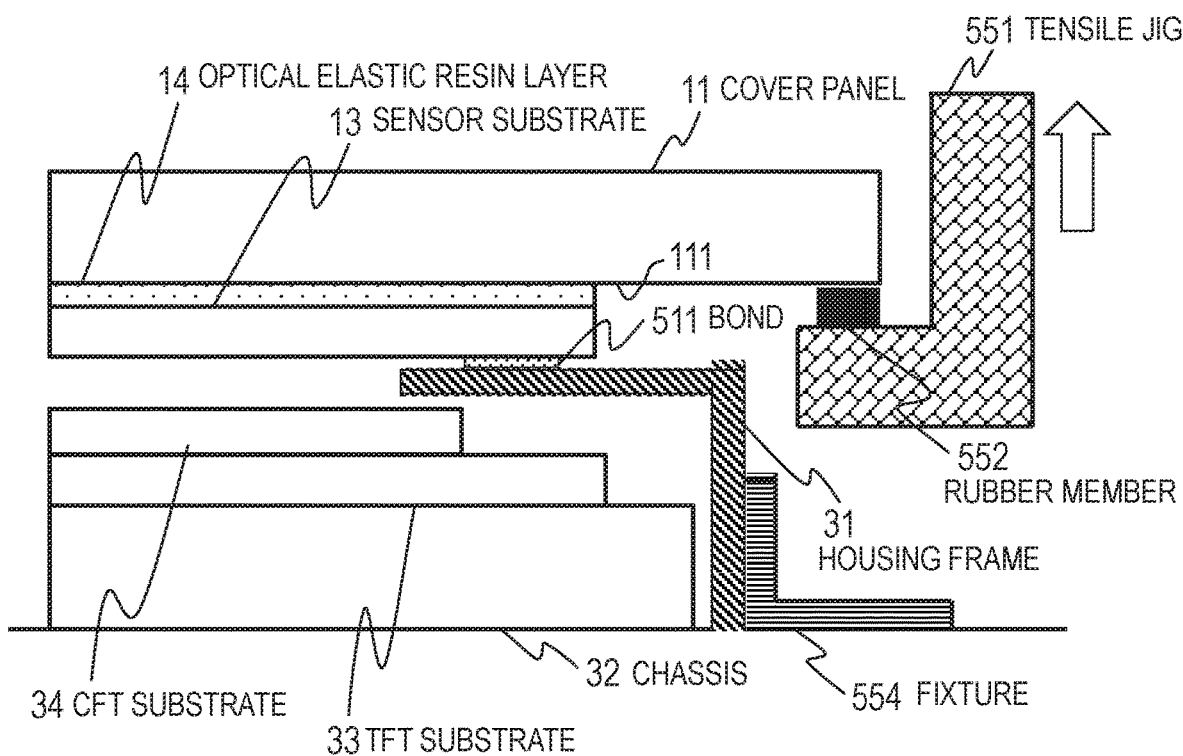
FIG. 7 schematically illustrates a method of measuring the detachment strength of the optical elastic resin layer in a display device.
FIG. 8 provides measurement results of the detachment strength of the optical elastic resin layer in the display devices of the embodiment and the comparative examples.

The detachment strengths of the optical elastic resin layers in the display devices having the configuration of the first comparative example (FIG. 5), the configuration of the second comparative example (FIG. 6), and the configuration of this embodiment (FIGS. 3A and 3B) were measured. FIG. 7 schematically illustrates the measurement method. The display module 30 was fixed with a fixture 554 and the back main face 111 of the cover panel 11 was put in contact with a rubber member 552 of a tensile jig 551. The measurement was made by lifting the cover panel 11 with the tensile jig 551 at 10 mm/min.

FIG. 8 provides measurement results of the tensile strength (detachment strength) when the optical elastic resin layer 14 is detached. A plurality of samples having the configuration of the first comparative example (FIG. 5), a plurality of samples having the configuration of the second comparative example (FIG. 6), and a plurality of samples having the configuration of this embodiment (FIGS. 3A and 3B) were prepared.

The typical values (average values) typ measured from the first comparative example, the second comparative example, and this embodiment were 25.5N, 55.4N, and 80.2N, respectively. The standard deviations σ of the values measured from the first comparative example, the second comparative example, and the embodiment were 0.73N, 10.0N, and 10.2N, respectively. The values (typ−3σ) obtained by subtracting 3σ from the typical values (average values) in the first comparative example, the second comparative example, and the embodiment were 23.3N, 25.4N, and 49.6N, respectively.

The typical value measured from the second comparative example was substantially twice of the typical value measured from the first comparative example; however, the expected minimum value among the variations (typ−3σ) in the second comparative example was substantially equal to the expected minimum value among the variations in the first comparative example.

On the other hand, the typical value measured from the embodiment was substantially 1.5 times of the typical value measured from the second comparative example. Furthermore, the expected minimum value among the variations (typ−3σ) in this embodiment was substantially twice of the expected minimum value among the variations in the second comparative example. That is to say, the configuration of this embodiment showed significant superiority in detachment resistance to both of the first comparative example and the second comparative example.

Other Embodiments

Figure 9:
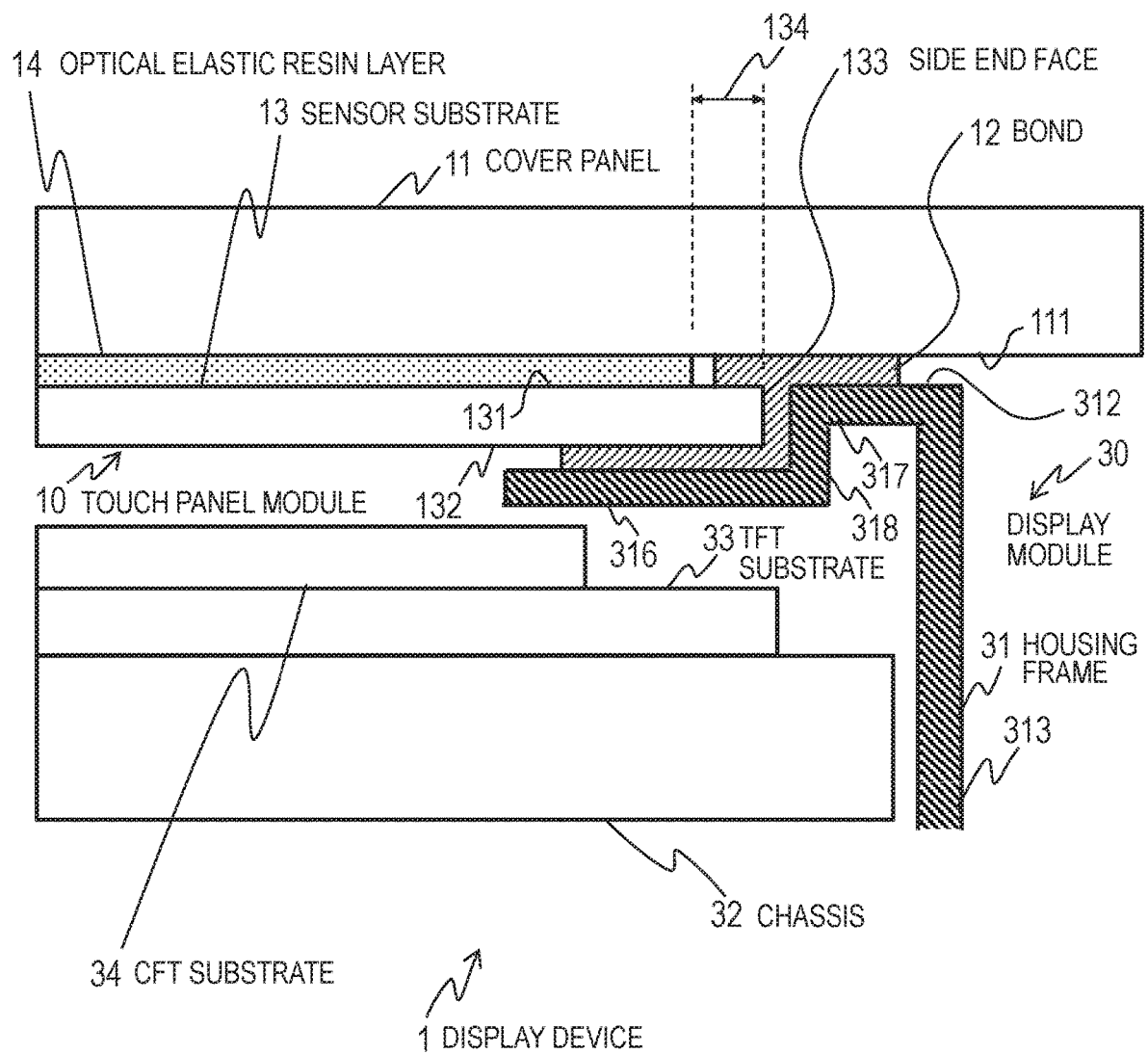
FIG. 9 illustrates a configuration of a display device in another embodiment.

Hereinafter, configurations of display devices in other embodiments are disclosed. FIG. 9 illustrates a configuration of a display device 1 in another embodiment. Compared to the configuration described with reference to FIGS. 3A and 3B, this configuration is different in the shape of the front rim 312 of the housing frame 31 and the shape of the bond 12. The front rim 312 is bent like steps.

The front rim 312 has a two-step structure having an inner step 316 (second step) and an outer step 317 (first step). The inner step 316 has a shape of a rectangular frame composed of four strip-like members when seen in the stacking direction. The outer step 317 has also a shape of a rectangular frame composed of four strip-like members when seen in the stacking direction. The outer step 317 surrounds the inner step 316 when seen in the stacking direction.

The inner step 316 is located deeper than the outer step 317. The inner step 316 is closer to the CF substrate 34 and farther from the touch panel module 10 than the outer step 317 in the stacking direction.

The inner step 316 is continued from the outer step 317 via a rise 318. The rise 318 is between the inner step 316 and the outer step 317 and continuous with them. The rise 318 rises from the outer end of the inner step 316 and continues to the inner end of the outer step 317. The rise 318 has a shape of a rectangular frame composed of four lines when seen in the stacking direction.

The sensor substrate 13 is placed in the space defined by the inner step 316 and the rise 318. The front face of the inner step 316 faces the back main face 132 of the sensor substrate 13. The rise 318 (the inner face thereof) faces the side end faces 133 of the sensor substrate 13. The outer step 317 surrounds the perimeter of the sensor substrate 13 when seen in the stacking direction. The sensor substrate 13 is accommodated in the inner space defined by the outer step 317 when seen in the stacking direction.

The front face of the outer step 317 faces the back main face 111 of the cover panel 11. The outer step 317 is continuous with the side faces 313 of the housing frame 31 along the outer end thereof.

The bond 12 is provided between the front face of the outer step 317 and the back main face 111 of the cover panel 11 and attached to them. The bond 12 is also spread between the side end faces 133 of the sensor substrate 13 and the rise 318 and attached to them. The bond 12 is further spread between the front face of the inner step 316 and the back main face 132 of the sensor substrate 13 and attached to them.

The gap between the front face of the outer step 317 and the back main face 111 of the cover panel 11 is narrower than the distance between the back main face 132 of the sensor substrate 13 and the back main face 111 of the cover panel 11. Compared to the configuration described with reference with FIGS. 3A and 3B, the bond 12 between the housing frame 31 and the cover panel 11 is thin.

For this reason, even if the cover panel 11 receives a force in the direction of detachment, the stress acts on the overall display device 1 without concentrating onto the bonding face of the optical elastic resin layer 14; accordingly, this configuration attains higher detachment resistance. In addition to this, the bend of the front rim 312 increases the stiffness of the front rim 312, achieving still higher detachment resistance.

Figure 10A:
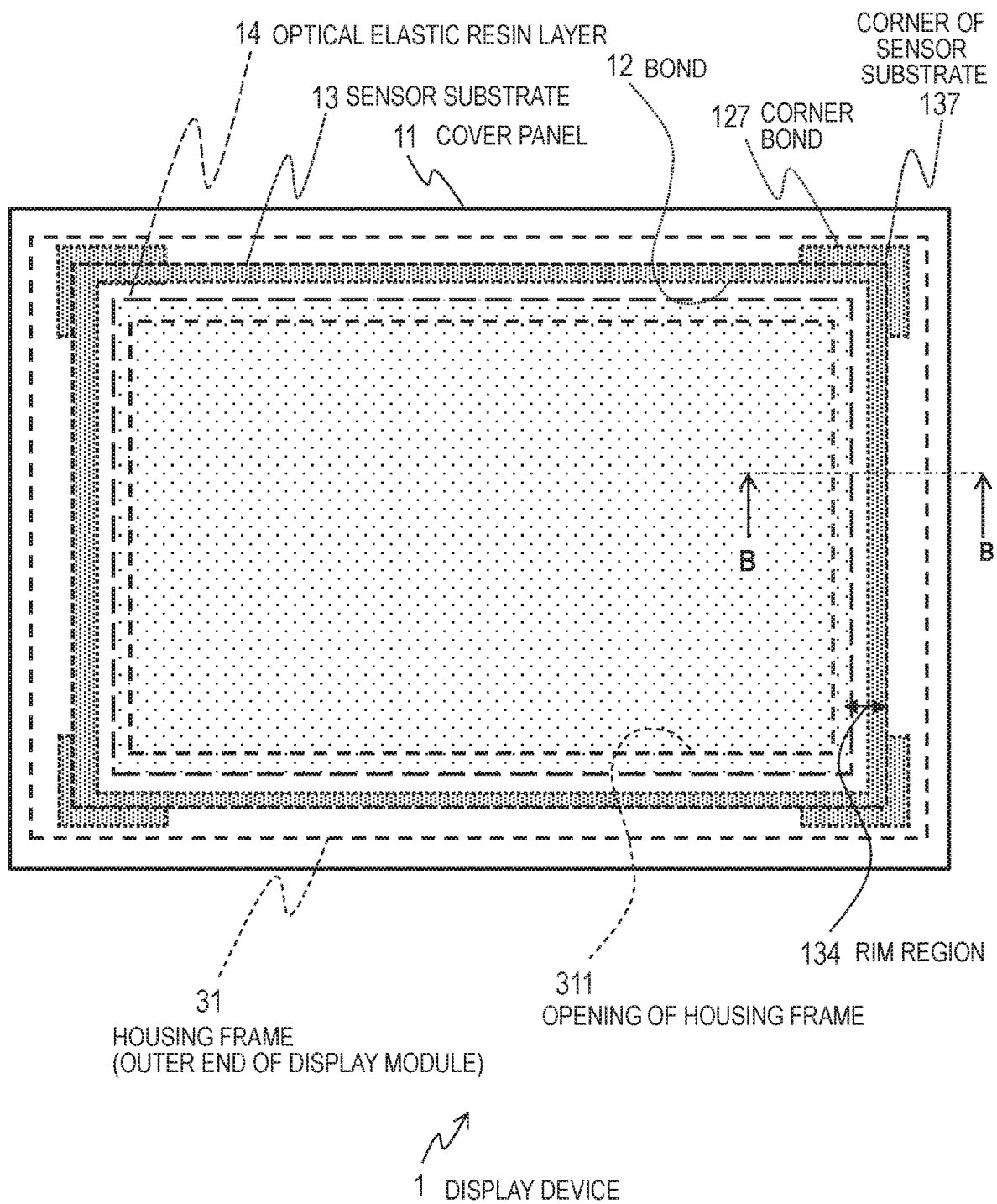
FIG. 10A is a plan diagram a display device in still another embodiment for illustrating the configuration thereof.
Figure 10B:
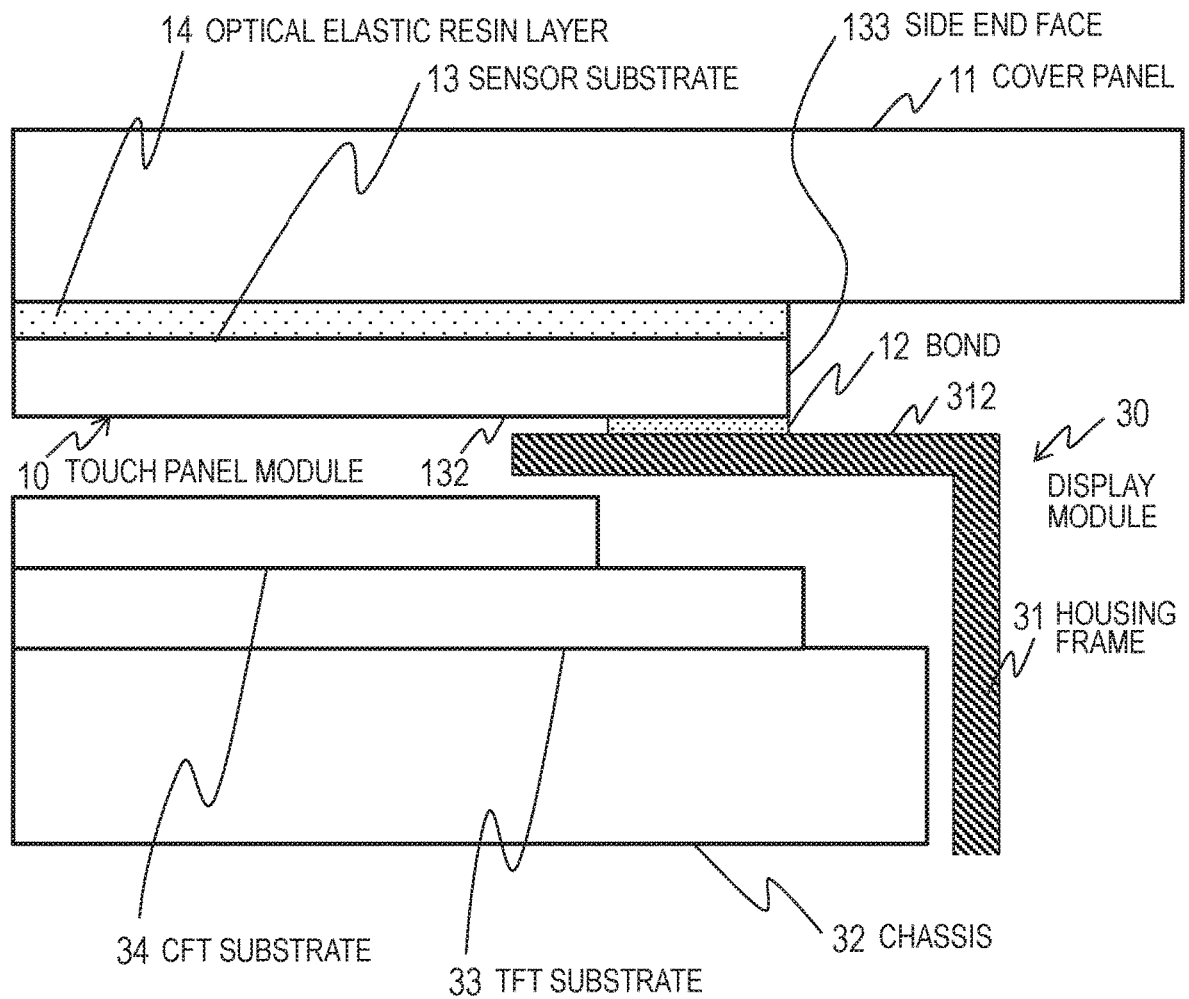
FIG. 10B is a cross-sectional diagram cut along the line B-B in FIG. 10A.

FIGS. 10A and 10B illustrate a configuration of a display device 1 in still another embodiment. FIG. 10A is a plan diagram of the display device 1 and FIG. 10B is a cross-sectional diagram cut along the line B-B in FIG. 10A. Compared to the configuration described with reference to FIGS. 3A and 3B, the bond 12 in this configuration example has a different shape.

As illustrated in FIG. 10A, the bond 12 in this configuration example is provided between the sensor substrate 13 and the housing frame 31 along the entire perimeter of the sensor substrate 13 to bond the sensor substrate 13 and the housing frame 31. As illustrated in FIG. 10B, the bond 12 is attached to only a part of each side end face 133 of the sensor substrate 13 and is not attached to the remaining part thereof. The bond 12 is attached to only a part of the region surrounding the sensor substrate 13 of the back main face 111 of the cover panel 11 and is not attached the remaining part thereof. The bond 12 is attached to only a part of the front rim 312 of the housing frame 31 and is not attached to the remaining part thereof.

As illustrated in FIG. 10A, the bond 12 includes four corner bonds 127 each attached to a region of two side end faces 133 defining a corner 137 of the sensor substrate 13, a region of the back main face 111 of the cover panel 11, and a region of the front rim 312 of the housing frame 31. In FIG. 10A, only one corner bond 127 is indicated with a reference sign. The cross-sectional structure of the corner bond 127 is the same as the one in FIG. 3B.

The bond 12 may have the cross-sectional structure in FIG. 3B only in a part of the peripheral area of the sensor substrate 13, like this example. Specifically, the bond 12 may be attached to continuous regions of the sensor substrate 13 including a region of the front main face 131 and the side end faces 133, a continuous region of the back main face 111 of the cover panel 11 including a region facing the sensor substrate 13 and a region outer than that, and a region of the front rim 312 of the housing frame 31.

Particularly, the bonding region of the bond 12 including a corner 137 between side end faces 133 of the sensor substrate 13 effectively reinforces the bonding of the sensor substrate 13 and the cover panel 11. The bonding region of the bond 12 may include at least a part of a corner 137 or include the entire corner 137.

Figure 11:
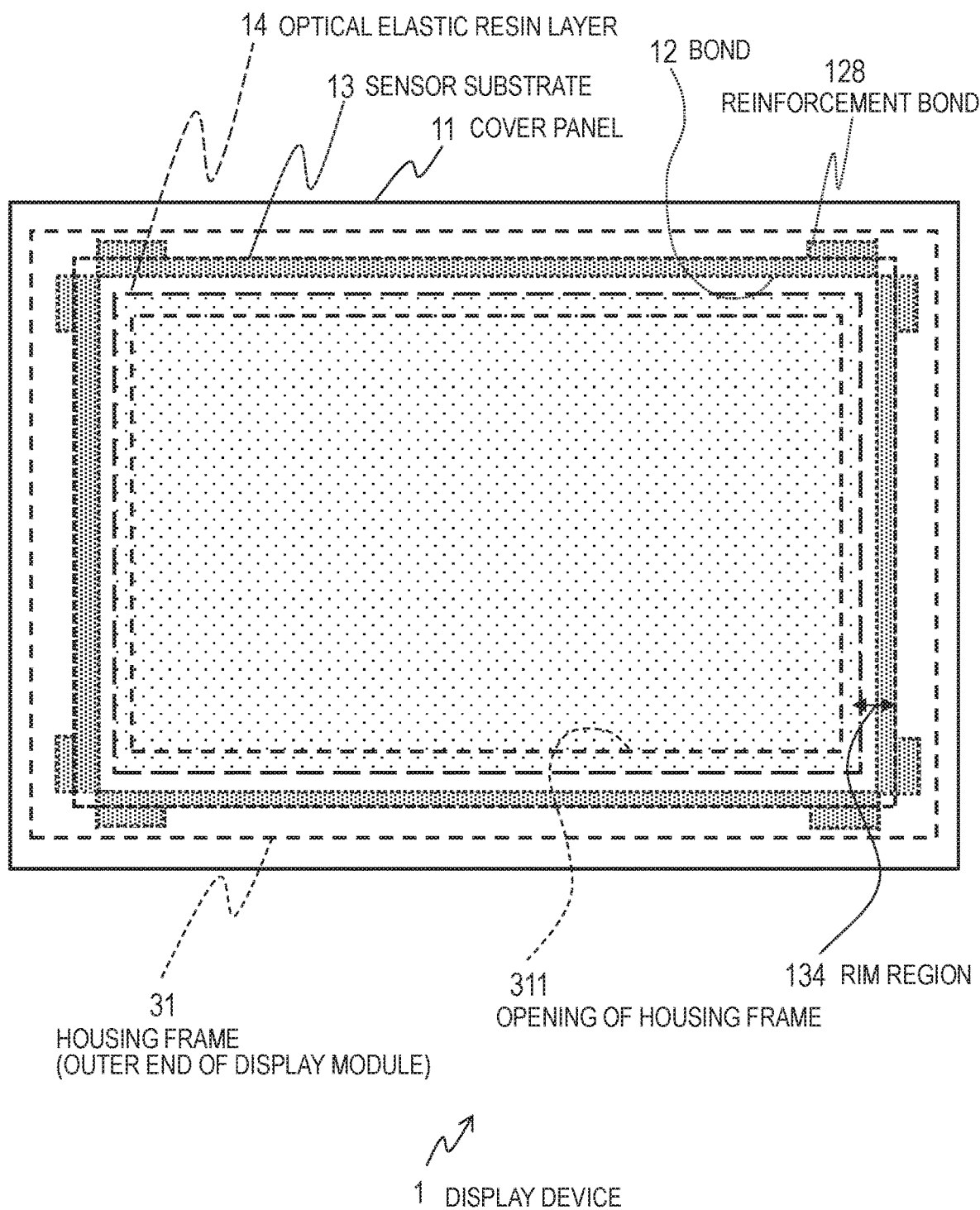
FIG. 11 illustrates a configuration of a display device in still another embodiment.

FIG. 11 illustrates a configuration of a display device 1 in still another embodiment. The bond 12 in this configuration example is provided between the sensor substrate 13 and the housing frame 31 along the entire perimeter of the sensor substrate 13 to bond the sensor substrate 13 and the housing frame 31. The bond 12 is attached to only a part of each side end face 133 of the sensor substrate 13 and is not attached to the remaining part thereof. The bond 12 is attached to only a part of the region surrounding the sensor substrate 13 of the back main face 111 of the cover panel 11 and is not attached to the remaining part thereof. The bond 12 is attached to only a part of the front rim 312 of the housing frame 31 and is not attached to the remaining part thereof.

As illustrated in FIG. 11, the bond 12 includes eight reinforcement bonds 128 each attached to a region of one side end face 133, a region of the back main face 111 of the cover panel 11, and a region of the front rim 312 of the housing frame 31. The cross-sectional structure of the reinforcement bond 128 is the same as the one in FIG. 3B. Like this example, the bond 12 may be attached to only the regions of the side end faces 133 of the sensor substrate 13 excluding the corners 137.

Figure 12:
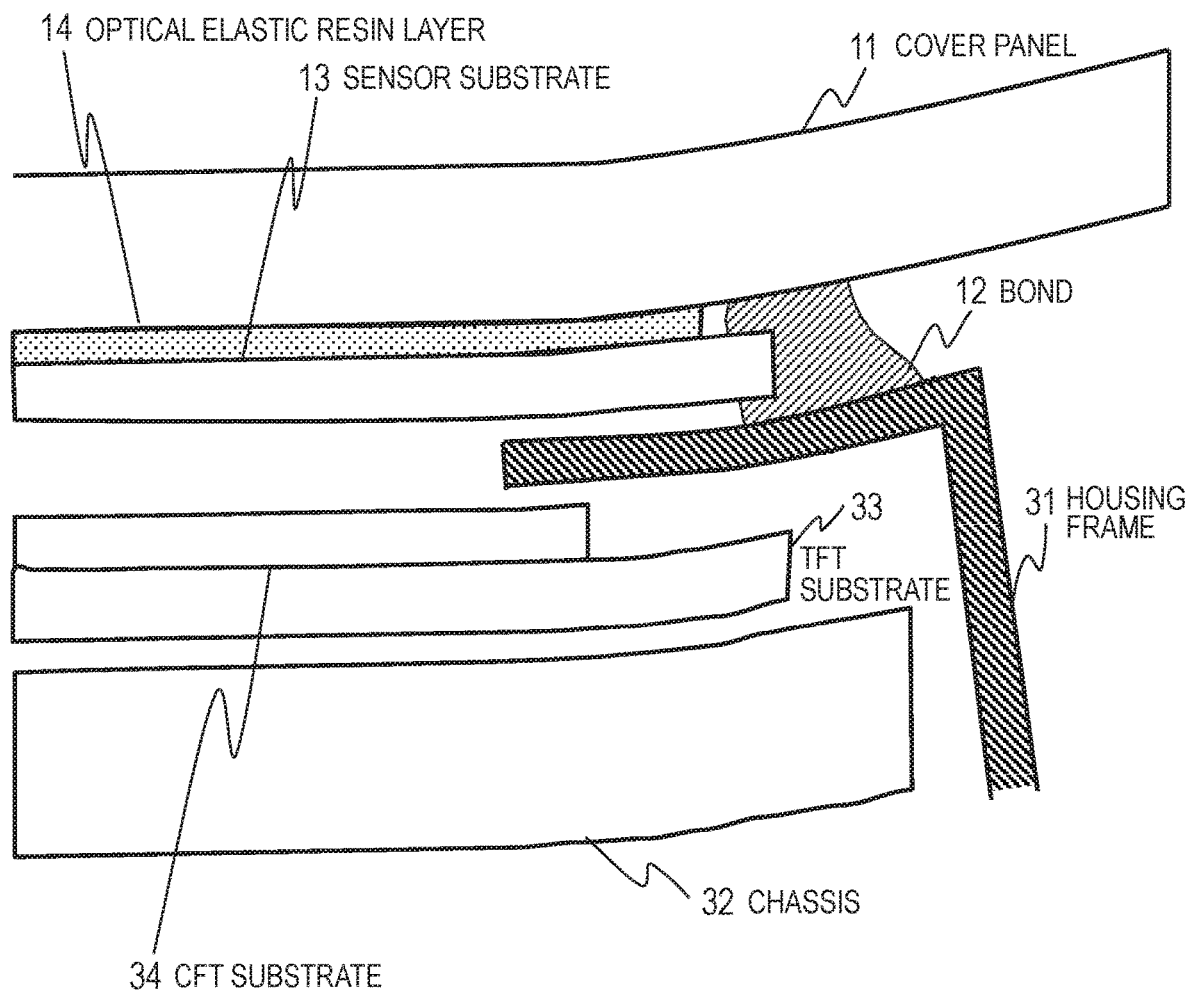
FIG. 12 illustrates a configuration of a display device in still another embodiment.

FIG. 12 illustrates a configuration of a display device 1 in still another embodiment. The display device 1 may have a curved shape. Specifically, the cover panel 11, the sensor substrate 13, the housing frame 31, the display panel, and the chassis 32 may be curved forward or backward when seen from the front. A typical manufacturing method bends a flat sensor substrate 13 to bond it with a curved cover panel 11. In this manufacturing method, the optical elastic resin layer 14 is easily detached because of the restoring force of the sensor substrate 13; however, this configuration example reinforces the bonding face of the optical elastic resin layer 14 more firmly.

Figure 13:
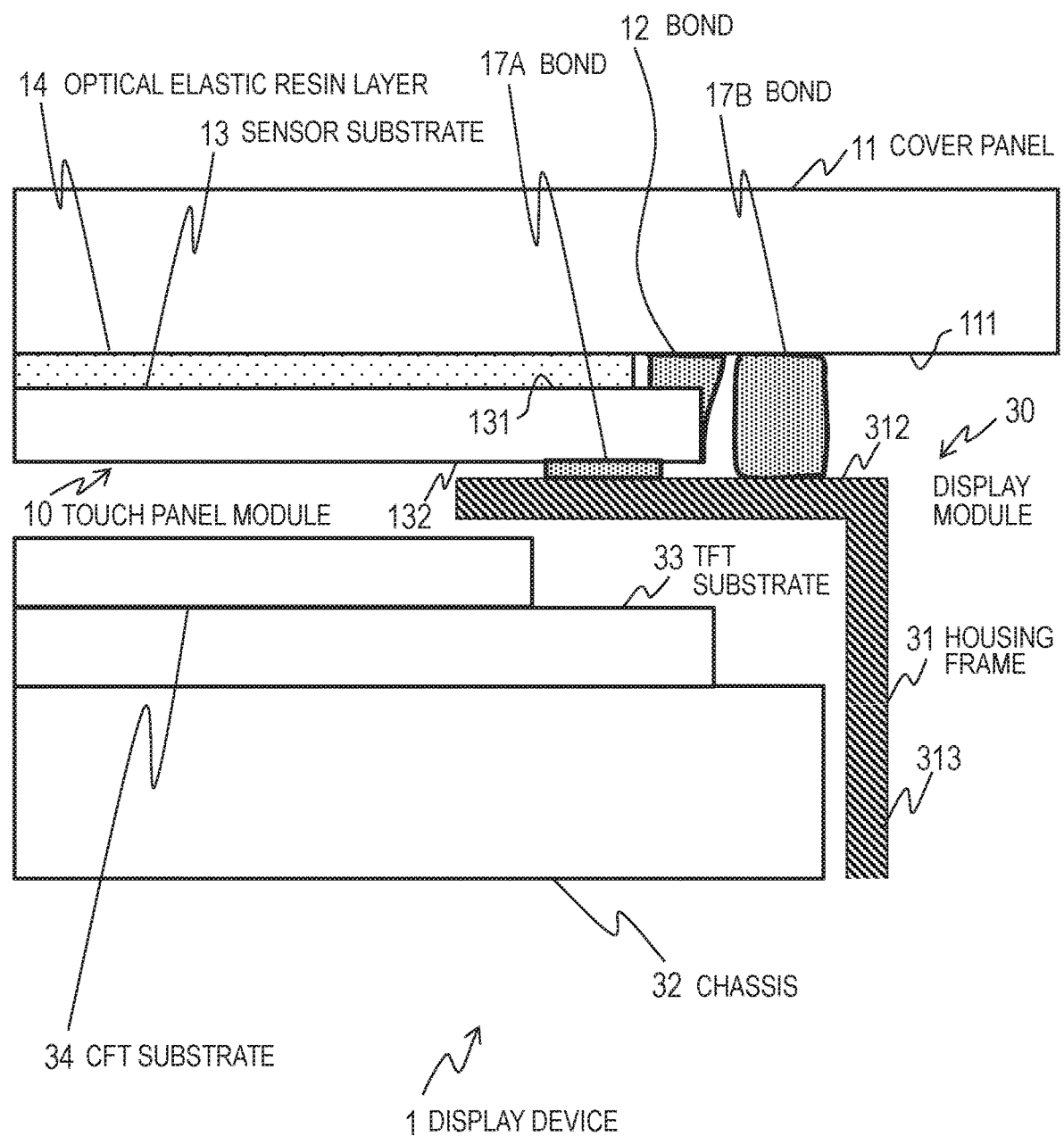
FIG. 13 illustrates a configuration of a display device in still another embodiment.

FIG. 13 illustrates a configuration of a display device 1 in still another embodiment. The display device 1 includes a bond 12, a second bond 17A, and a third bond 17B. The second bond 17A and the third bond 17B each have a shape of a rectangular frame along the periphery of the sensor substrate 13, when seen in the stacking direction.

The bond 12 has the structure described with reference to FIGS. 1A and 1B to bond only the sensor substrate 13 and the cover panel 11. The bond 12 does not bond the touch panel module 10 and the display module 30.

The second bond 17A is provided between the back main face 132 of the sensor substrate 13 and the front face of the front rim 312 of the housing frame 31 to bond them. The third bond 17B is provided between the back main face 111 of the cover panel 11 and the front face of the front rim 312 of the housing frame 31 to bond them. The second bond 17A and the third bond 17B are distant from the side end faces 133 of the sensor substrate 13. Either one of the second bond 17A and the third bond 17B may be omitted.

Figure 14:
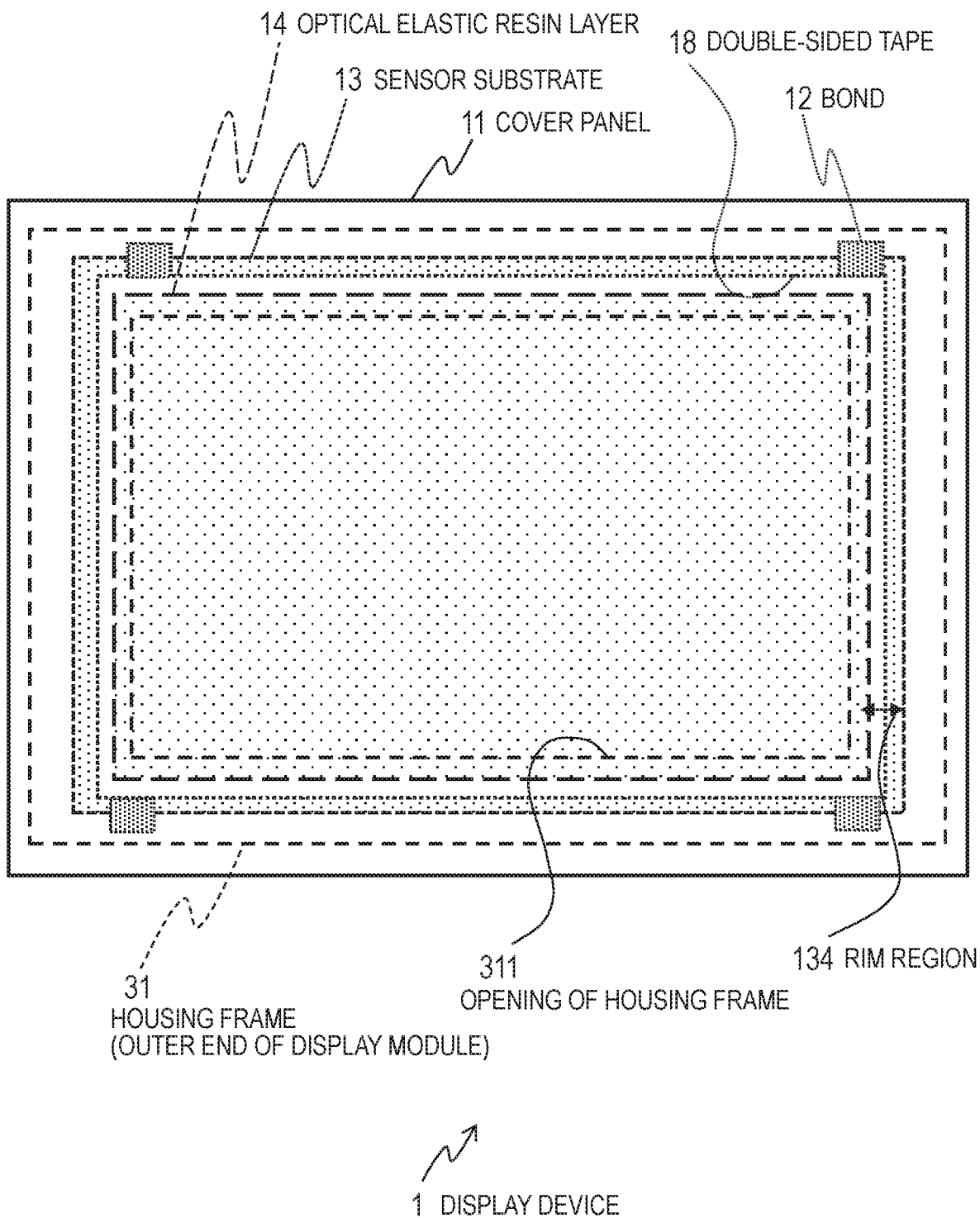
FIG. 14 illustrates a configuration of a display device in still another embodiment.

FIG. 14 illustrates a configuration of a display device 1 in still another embodiment. The display device 1 includes four separate bonds 12. The cross-sectional structure of each bond 12 is the same as the one described with reference to FIG. 3B. A double-sided tape 18 is provided between bonds 12. The double-sided tape 18 is sandwiched by the back main face 132 of the sensor substrate 13 and the front face of the front rim 312 of the housing frame 31 to bond them.

Figure 15:
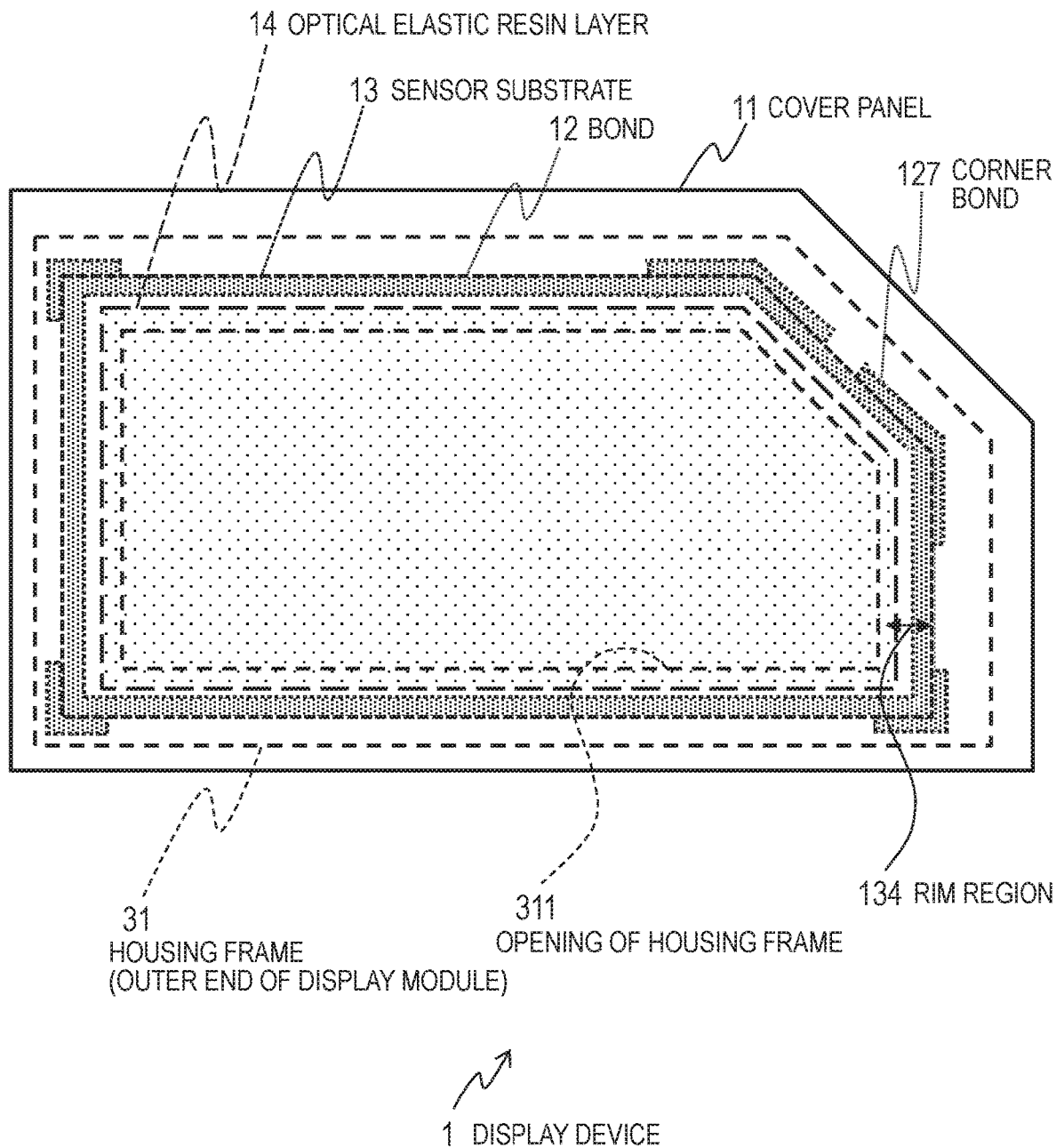
FIG. 15 illustrates a configuration of a display device in still another embodiment.

FIG. 15 illustrates a configuration of a display device 1 in still another embodiment. The display device 1 has a polygonal shape having at least five corners. The configuration example in FIG. 15 has a pentagonal shape. The configuration example in FIG. 15 has a corner bond 127 on each corner. The configuration example in FIG. 15 is the same as the configuration example illustrated in FIGS. 10A and 10B, except that the display device 1 has more corners. The display device 1 may have a circular shape.

As described above, the display devices 1 in the other embodiments have the bonding of the cover panel and the sensor substrate reinforced by the bond(s) to lower the probability that the optical elastic resin layer is detached because of the force applied to the touch panel module.

As set forth above, embodiments of this invention have been described; however, this invention is not limited to the foregoing embodiments. Those skilled in the art can easily modify, add, or convert each element in the foregoing embodiment within the scope of this invention. A part of the configuration of one embodiment can be replaced with a configuration of another embodiment or a configuration of an embodiment can be incorporated into a configuration of another embodiment.

What is claimed is:

1. A panel module comprising:
   a first substrate having a first main face;
   a second substrate laid over the first substrate, the second substrate having a second main face facing the first main face;
   a bonding resin layer provided between the first main face and the second main face and bonding the first main face and the second main face; and
   a bond made of cured adhesive,
   wherein at least a part of an outer end face of the bonding resin layer is located inner than an outer end face of the first substrate and an outer end face of the second substrate,
   wherein the bond has a stronger bonding force and a higher elasticity than the bonding resin layer,
   wherein the bond is attached to a first region of the first main face and a second region of the second main face in an area outer than the bonding resin layer and between the first main face and the second main face,
   wherein the bond is attached to a third region of the outer end face of the second substrate and a fourth region of the first main face, the fourth region being a region continued from the first region in an area outer than the outer end face of the second substrate, and wherein the bond is distant from the bonding resin layer and a space is provided between the bond and the bonding resin layer.

2. The panel module according to claim 1, wherein the third region of the outer end face includes a region surrounding the entire perimeter of the second substrate.

3. The panel module according to claim 1, wherein the third region includes at least a part of a corner of the outer end face of the second substrate.

4. The panel module according to claim 3, wherein the bond is attached to all corners of the outer end face of the second substrate.

5. The panel module according to claim 1, further comprising a plurality of separate bonds, wherein each of the plurality of bonds has a stronger bonding force and a higher elasticity than the bonding resin layer, wherein each of the plurality of bonds is attached to a fifth region of the first main face and a sixth region of the second main face in an area outer than the bonding resin layer and between the first main face and the second main face, and wherein each of the plurality of bonds is attached to a seventh region of the outer end face of the second substrate and an eighth region of the first main face, the seventh region being a region continued from the sixth region, and the eighth region being a region continued from the fifth region in an area outer than the outer end face of the second substrate.

6. A display device comprising:
a display module; and
a panel module according to claim 1, the panel module being disposed in front of the display module,
wherein the bond is attached to a ninth region facing the first main face of the display module.

7. The display device according to claim 6,
wherein the display module includes:
a display panel; and
a housing frame covering at least a part of a rim of a front face of the display panel, and
wherein the ninth region is included in a region of the housing frame facing the first main face.

8. The display device according to claim 7,
wherein the housing frame covers the entire rim of the front face of the display panel,
wherein the third region of the outer end face includes a region surrounding the entire perimeter of the second substrate, and
wherein the ninth region includes a region along the entire outer end of the housing frame.

9. The display device according to claim 7, wherein the bond is attached to a face opposite to the second main face of the second substrate and the housing frame in an area between the opposite face and the housing frame.

10. A display device comprising:
a display module; and
a panel module comprising:
a first substrate having a first main face;
a second substrate laid over the first substrate, the second substrate having a second main face facing the first main face;
a bonding resin layer provided between the first main face and the second main face and bonding the first main face and the second main face; and
a bond made of cured adhesive,
wherein at least a part of an outer end face of the bonding resin layer is located inner than an outer end face of the first substrate and an outer end face of the second substrate,
wherein the bond has a stronger bonding force and a higher elasticity than the bonding resin layer,
wherein the bond is attached to a first region of the first main face and a second region of the second main face in an area outer than the bonding resin layer and between the first main face and the second main face, and
wherein the bond is attached to a third region of the outer end face of the second substrate and a fourth region of the first main face, the fourth region being a region continued from the first region in an area outer than the outer end face of the second substrate,
wherein the panel module is disposed in front of the display module,
wherein the bond is attached to a ninth region facing the first main face of the display module,
wherein the display module includes:
a display panel; and
a housing frame covering at least a part of a rim of a front face of the display panel,
wherein the ninth region is included in a region of the housing frame facing the first main face,
wherein the housing frame includes a step-like part,
wherein the step-like part includes:
a first step including the ninth region; and
a second step continued from the first step at inside of the first step and located closer to the display module than the first step,
wherein the second step faces the face opposite to the second main face of the second substrate, and
wherein the bond is attached to the face opposite to the second main face and the second step.

* * * * *